(12) United States Patent
Küchel

(10) Patent No.: US 7,218,403 B2
(45) Date of Patent: *May 15, 2007

(54) SCANNING INTERFEROMETER FOR ASPHERIC SURFACES AND WAVEFRONTS

(75) Inventor: Michael Küchel, Oberkochen (DE)

(73) Assignee: Zygo Corporation, Middlefield, CT (US)

( * ) Notice: Subject to any disclaimer, the term of this patent is extended or adjusted under 35 U.S.C. 154(b) by 191 days.

This patent is subject to a terminal disclaimer.

(21) Appl. No.: 11/064,731

(22) Filed: Feb. 24, 2005

(65) Prior Publication Data

US 2005/0157311 A1  Jul. 21, 2005

Related U.S. Application Data

(63) Continuation-in-part of application No. 10/295,479, filed on Nov. 15, 2002, now Pat. No. 6,879,402, and a continuation-in-part of application No. 10/180,286, filed on Jun. 26, 2002, now Pat. No. 6,972,849.

(51) Int. Cl.
*G01B 11/02* (2006.01)

(52) U.S. Cl. .................................. 356/513

(58) Field of Classification Search ............. 356/457, 356/458, 489, 495, 511, 512, 513, 515
See application file for complete search history.

(56) References Cited

U.S. PATENT DOCUMENTS

| | | | |
|---|---|---|---|
| 4,697,927 A | 10/1987 | Ono | |
| 5,004,346 A | 4/1991 | Kuhel | |
| 5,187,539 A | 2/1993 | Adachi et al. | |
| 5,416,586 A | 5/1995 | Tronolone et al. | |
| 5,625,454 A | 4/1997 | Huang et al. | |
| 5,844,670 A | 12/1998 | Morita et al. | |
| 6,222,621 B1 | 4/2001 | Taguchi | |
| 6,312,373 B1 | 11/2001 | Ichihara | |
| 6,456,382 B2 | 9/2002 | Ichihara et al. | |
| 6,714,308 B2 | 3/2004 | Evans et al. | |
| 6,781,700 B2 | 8/2004 | Kuchel | |
| 6,879,402 B2 | 4/2005 | Kuchel | |
| 6,972,849 B2 * | 12/2005 | Küchel | 356/513 |

OTHER PUBLICATIONS

Supplementaryeuropean Search Report for EPO Application No. 02789681.0,Jul. 27, 2006.

(Continued)

*Primary Examiner*—Gregory J. Toatley, Jr.
*Assistant Examiner*—Michael A. Lyons
(74) *Attorney, Agent, or Firm*—Francis J. Caufield

(57) ABSTRACT

Interferometric scanning method(s) and apparatus for measuring optics either having aspherical surfaces or that produce aspherical wavefronts. A test optic is aligned and moved with respect to a scanning axis relative to the origin of a known spherical wavefront that is generated with a reference surface to intersect the test optic at the apex of the aspherical surface and at radial zones where the spherical wavefront and the aspheric surface possess common tangents. The test surface is imaged onto a space resolving detector to form interferograms containing phase information about the differences in optical path length between the reference surface and the test surface while the axial distance which the test optic moves relative to the spherical reference surface is interferometrically measured. The deviation in the shape of the aspheric surface from its design in a direction normal to the aspheric surface is determined and reported.

27 Claims, 19 Drawing Sheets

OTHER PUBLICATIONS

Lin, Ding-tin, and Wang, Der-Shen. "Profile Measurement Of An Aspheric Cylindrical Surface From Retroreflection." Applied Optics, vol. 30, No. 22 (Aug. 1, 1991): pp. 3200-3204.

Dörband, B. et al., "High Precision Interferometric Measurements of Lens Elements." Fringe "97: Proceedings of the 3rd International Workshop on Automatic Processing of Fringe Patterns Held in Bremen, Germany, Sep. 15-17, 1997. pp. 473-480.

V. Greco, et al., "Interferometric testing of weak aspheric surfaces versus design specifications", Optik, 87, No. 4 (1991), pp. 159-162.

* cited by examiner

SCANNING INTERFEROMETER FOR ASPHERIC SURFACES AND WAVEFRONTS

CROSS REFERENCE TO RELATED APPLICATION

This application is a continuation-in-part of U.S. patent application Ser. No. 10/180,286 filed on Jun. 26, 2002, now U.S. Pat. No. 6,972,849, in the name of Michael Küchel for "SCANNING INTERFEROMETER FOR ASPHERIC SURFACES AND WAVEFRONTS", and a continuation-in-part of U.S. patent application. Ser. No. 10/295,479 filed on Nov. 15, 2002, now U.S. Pat. No. 6,879,402, in the name of Michael Küchel for "SCANNING INTERFEROMETER FOR ASPHERIC SURFACES AND WAVEFRONTS", the entire contents of both of which are incorporated herein by reference.

FIELD OF THE INVENTION

In general, this invention relates to the field of interferometry and, in particular, to the high accuracy measurement of aspherical surfaces and wavefronts in an absolute manner.

BACKGROUND OF THE INVENTION

Aspherical surfaces have become more and more important in modern optical systems because they offer a higher number of parameters for simplifying systems while optimizing their performance. This can lead to systems with less surfaces, less weight, smaller dimensions and higher states of correction, to mention only a view advantages. This is especially true in fields where a high number of optical surfaces are not practical, like in astronomical telescopes or normal incidence reflecting surfaces for the EUV wavelength of 13.6 nm used for lithography tools where it is mandatory to keep the number of surfaces as low as possible. In such cases, there is no choice but to use aspherical surfaces. With demands for high quality performance for complete systems operating in the EUV-regime; the surface errors of reflecting surfaces within such a system must be kept below 0.1 nm, and the measuring accuracy and precision for such errors must be even higher to be able to produce the surfaces in a deterministic manner. In addition, lens surfaces in multi-element lithography lenses operating at wavelengths of 193 nm and 157 nm are made aspherical to lower the number of elements made, which are of rare and expensive materials. In these cases, the departures from a best fitting sphere can be as large as 1000 μm, and the dimensions of such lens surfaces have increased to nearly 500 mm.

In an optical system, the function of any of its lens elements is to modify the wavefront transmitted by the individual lens elements according to the optical design of the whole system. If a spherical wave or a plane wave enter such a lens, an aspherical wavefront with a very high departure from the best fitting sphere is produced, depending on the conjugates used in the particular test-configuration. So even the fundamental single lens element with either spherical or aspherical surfaces can only be tested properly if one is able to deal with aspherical wavefronts in a test set-up. Moreover, this ability is very important to testing wavefronts transmitted through lens elements because inhomogeneity of the lens material itself can deteriorate the wavefront even when the surfaces are otherwise free of error.

The measurement of aspherical surfaces and wavefronts has been very difficult because of the large departure from the best fitting sphere. With interferometric measurements, high precision is by making the dynamic range of the measurement very small, and for this purpose, the wavefront of the reference wavefront, against which the aspherical wavefront is compared, has to be made aspherically as well to ideally fit the wavefront to be measured completely. In prior art, this has been done either by refractive systems, so called "null-lenses", or with diffractive elements, so called "computer generated holograms", which alter a wave of known and measurable shape (spherical or preferably plane wave) as it transits the compensation element to fit the design aspherical surface at the location where it is placed in the test-set up by design.

In all these cases, the compensation element must be tested to be sure that the correct wavefront is delivered for comparison. But, it is obvious that the same difficulties exist for this type of testing because, again, an aspherical wavefront is produced. Therefore, only indirect test methods are, applied by, for instance, measuring the surface of each lens element used in a null system, which is exclusively built with the help of spherical surfaces. Also, the refractive index of the lens material, the lens thickness and the air-spacing of the lenses are measured carefully. Nevertheless, the final accuracy is questionable because of accumulation of measurement errors and the uncertainty of the homogeneity within the lens, material.

There are many methods and apparatus in the prior art for measuring aspherical optical surfaces, for example: 1. Contacting and non-contacting stylus based profilers; 2. Contacting and non-contacting stylus based coordinate measuring machines; 3. Spherical wavefront interferometers; 4. Lateral and radial shearing interferometers; 5. Interferometers with null lenses in the measurement path; 6. Scanning spherical wave interferometers; 7. Scanning white light interferometers; 8. Sub-aperture stitching interferometers; 9. Interferometers using computer generated holograms-CGHs; 10. Point diffraction interferometers-PDis; 11. Longer wavelength interferometry; and 12. Two wavelength interferometry. While these techniques have utility for many applications, they are limited in their operational capabilities or precision compared with those needed for today's evolving lithography applications.

Contacting and non-contacting stylus based profilers mechanically scan the aspherical surface under test and, therefore, are slow because they measure only a few data points at a time. Slow techniques are very susceptible to measurement errors due to temperature variations during the measurement. The same limitations apply to contacting and non-contacting stylus based coordinate measuring machines.

Spherical wavefront interferometers usually require the spacing between the element generating the spherical wavefront and the aspherical surface under test to be scanned thereby increasing the measurement time for the entire surface under test thus introducing another parameter which must be measured, usually by another measurement device, and means, commonly known as stitching, for connecting the data from the various zones which fit as the spacing is scanned.

Scanning white light interferometers have many of the same limitations as spherical wavefront interferometers. Lateral and radial shearing interferometers usually measure the slope of the surface under test and thereby introduce measurement errors during the reconstruction of the surface under test via integration of the slopes. This latter type of limitation applies to differential types of profiling techniques as well.

Sub-aperture stitching interferometers introduce serious measurement errors in the stitching process. Interferometers using computer generated holograms are susceptible to errors introduced by the CGH and stray Moiré patterns. It is also difficult to calibrate, i.e., know the calibration of the CGH. Point diffraction interferometers are a class of spherical wavefront interferometers, and therefore, have many of the same limitations, as well as poor lateral spatial resolution.

None of the prior art approaches is entirely satisfactory since each involves a trade-off that places long lead times on the design of the measurement apparatus and method, requires additional fabrication, increases the difficulty of using and calibrating the measurement apparatus, decreases the accuracy and precision, and greatly increases the cost and delivery time of the aspherical optical element.

As a result of certain deficiencies in prior approaches to measuring aspheres, it is a principle object of the present invention to provide a method(s) and apparatus for high accuracy absolute measurement of aspherical surfaces or aspherical wavefronts, either the surface of the final optical part or the wavefront of the final optical lens element in transmission, or by absolutely qualifying the compensation elements for the measurement of aspheres, being either of the refractive, diffractive of reflective type, therefore enabling other, more productive methods for the measurement of the components to be produced in volume.

It is another object of this invention to measure the deviation of a given surface, such as an aspheric surface, from its nominal design shape in a direction normal to the surface.

It is another object of the present invention to provide method(s) and apparatus for measuring aspherical surfaces and wavefronts with large aspherical departures and surface slopes.

It is yet another object of this invention to provide method(s) and apparatus for measuring aspherical surfaces and wavefronts with small departures from spherical surfaces.

It is another object of the present invention to provide method(s) and apparatus for measuring aspherical surfaces and wavefronts with large diameters and clear aperture.

It is yet another object of the present invention to provide method(s) and apparatus which can be adapted to different measurement purposes and aspherical surfaces and wavefronts in an easy manner.

It is still another object of the present invention to provide method(s) and apparatus for measuring aspherical surfaces and wavefronts which can be calibrated absolutely.

It is a further object of the present invention to provide method(s) and apparatus which have highly reduced sensitivity to vibrations when measuring aspherical surfaces and wavefronts.

It is another object of the present invention to provide method(s) and apparatus which have reduced sensitivity to temperature changes in the measurement of aspherical surfaces and wavefronts.

It is yet another object of the present invention to provide method(s) and apparatus which have reduced sensitivity to air turbulence of the gas in the interferometer (measurement) cavity in measuring aspherical surfaces and wavefronts.

It is a further object of the present invention to provide method(s) and apparatus that can work with a light source of only a coherence length equal to the aspherical departure.

It is yet a further object of the present invention to provide method(s) and apparatus which can also work with wavelengths for which only point detectors exist (UV and IR-range).

It is still a further object of the present invention to provide method(s) and apparatus which automatically adjust for the spatial location from where the measurement points are sampled.

It is still another object of the present invention to provide method(s) and apparatus which can be adjusted to the spatial resolution required for the measurement.

It is yet a further object of the present invention to provide method(s) and apparatus which have reasonable speed of measurement.

It is still a further object of the present invention to provide method(s) and apparatus which compute both critical coordinates of the aspherical surface, the radial distance h and the axial distance, z, solely from interferometric measurements and not from the geometrical mapping of the detectors onto the surface.

Other objects of the invention will, in part, be obvious and will, in part, appear hereinafter when the detailed description is read with reference to the drawings.

SUMMARY OF THE INVENTION

In one aspect of the method and apparatus for measuring aspherical surfaces and wavefronts according to the invention, an aspherical: surface is, illuminated with a wavefront that fits the shape of the surface only in some locations, which are at the center and a radial "zone". In those locations, the surface has the same slope as the illuminating wavefront, i.e., the rays strike the aspherical surface at normal incidence and are reflected back by auto-collimation. It is only in those locations where measurement data points are sampled at the instant of normal incidence.

In one variation of the basic principle, the incidence of the rays is not normal to the surface, but the parts of the surface where the actual measurement points are sampled act again as to image the light source with unit magnification, but in a reversed real image.

According to the invention, the optical path difference between the center and the "zone" is measured by bringing those rays to interfere with each other and measuring the intensity of the interference. The correct and useful rays for that interference are automatically sampled by the use of an aperture, which is located in the image of the light source.

In accordance with the invention, an aspherical test surface is shifted along a scanning axis and as it travels, the same center-part as before is hit by rays, which later enter the aperture, but now the "zone" shifts radially to a new location in correspondence with the axial position of the test surface. In each of the radial "zones" the criterion of normal incidence or, respectively, the imaging criterion of the light-source into the aperture is satisfied. Scanning the aspherical surface axially causes the optical path-difference between the rays from the center and the radially moving zone to change, and the measured intensity of the interference is modulated. With a sliding windowing technique and an appropriate phase-measurement algorithm, the phase-information is extracted from the measured intensity, and from the phase, the optical path difference is calculated. This is done with an algorithm that allows computation of not only the axial position, z, on the aspherical surface, but also the lateral height, h, of each radial "zone", where the rays are sampled. This is achieved by measuring the optical, path difference of the two rays: (1) from the light source to the zone and back to the sampling aperture and (2) from the light source to the center and back to the sampling aperture interferometrically, while also measuring the scanning of the aspherical surface with the help of an external distance measuring interferometer (DMI). Consequently, two quantities are measured with interferometric precision with the condition of autocollimation satisfied where the light, rays are incident normal to the surface or, equivalently but more generally, that the light source is imaged onto the sampling aperture with magnification=−1.

According to another aspect of the invention, the light-source and a corresponding sampling aperture are rings with diameters large enough to be able to resolve the image of the test surface onto the detectors azimuthally, and with a ring width that is small enough to isolate the coherent light from the small areas on the test surface that are probed.

It is a special feature of the invention that the detectors are not located in a conjugate to the test surface in the radial direction (i.e., an image of the surface) as is the case for the azimuthal direction, but in a conjugate (i.e., an image) of the light source. With this arrangement, the rays from the center and the "zone" are made to interfere because they are not separated on the detector but made to be on top of each other. The imaging optics behind the sampling aperture is an anamorphic one, but in the sense of radial coordinates, not Cartesian as in the usual case. This special anamorphic imaging is derived by a holographic optical element (similar to a Fresnel zone plate). For detectors, PIN diodes, or the like, having similar sensitivity and frequency response are preferred.

According to another aspect of the invention, a test-set up is calibrated absolutely by measuring an aspherical surface of known shape in the same way as an unknown aspherical surface would be probed, i.e., by scanning axially. This known surface could be a parabola, for instance, which can be measured absolutely with the help of a known plane mirror and a known spherical mirror using known procedures available to measure those surfaces in an absolute manner. Another possibility is to use a lens with spherical surfaces used in transmission together with a known autocollimation mirror. The lens can be measured in transmission beforehand in an absolute manner with the use of other conjugates.

According to another aspect of the invention, spherical surfaces, mildly aspheric surfaces, and mildly aspheric surfaces that have more than one departure from a sphere can be measured by using the inventive procedures to locate the zone of contact, unwrap the measured phase values and calculate the phase difference between a zone and the center of the interferogram.

In accordance with another aspect of the invention, a scanning interferometric apparatus and associated algorithms operate to measure the deviation of a given surface as, for example, an aspheric surface, with respect to its nominal design value in directions normal to the surface.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION

Figure 1:
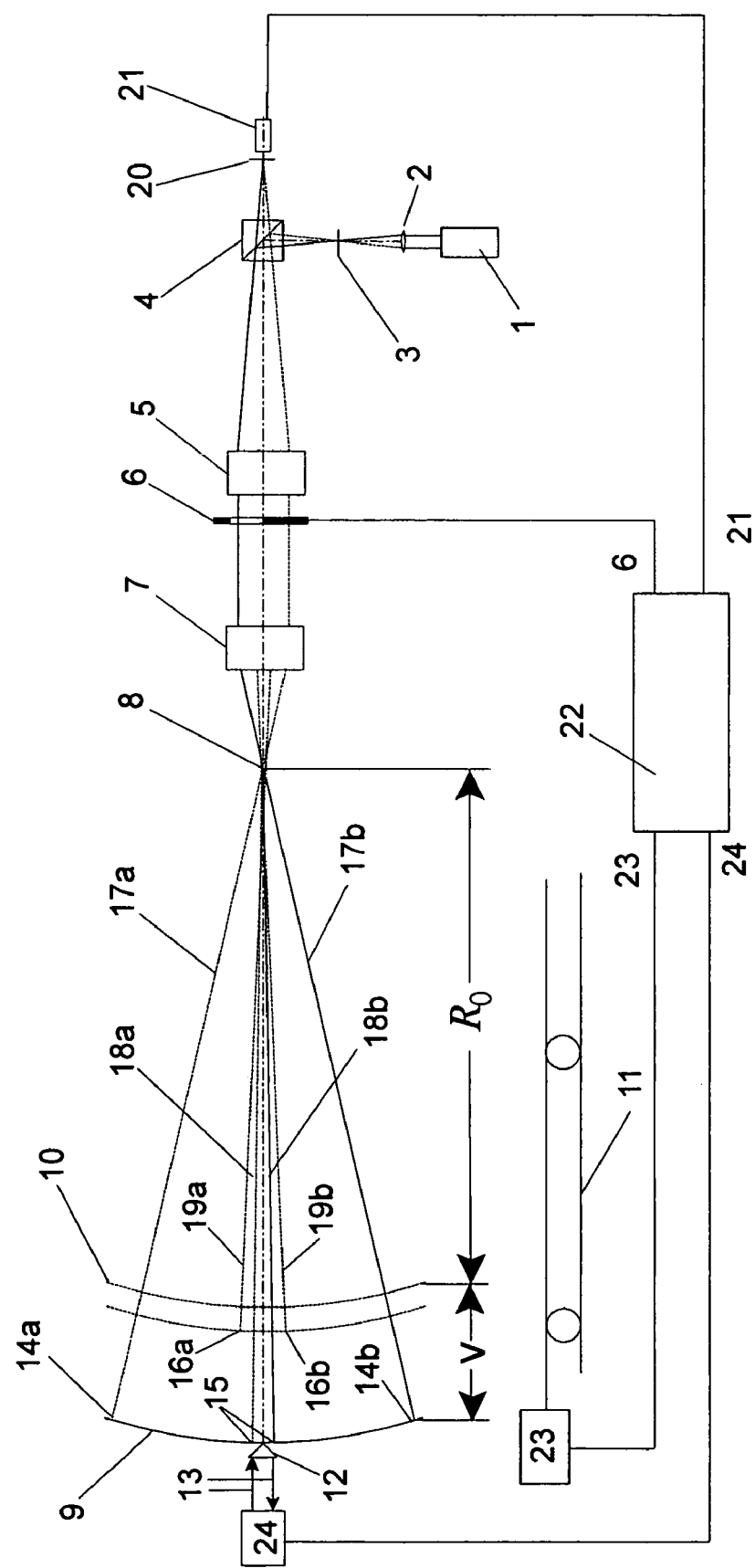
FIG. 1 is a diagrammatic side elevational view of a preferred embodiment of the invention.

The preferred embodiments together with a associated algorithms will now be described in a more detailed manner. Reference now made to FIG. 1 that shows a simple embodiment of the invention. Light from a coherent light source 1 is focused by a lens 2 into an aperture 3 and hits a beamsplitter 4. The aperture 3 is located in the focal plane of a collimator lens 5, so a plane wave emerges from the collimating lens 5. This plane wave strikes a slit aperture 6, which may be worked into a piece of metal or evaporated onto a glass plate. In FIG. 1, slit aperture 6 lets rays above the optical axis pass and blocks the rays below the optical axis; but a certain region around the optical axis is open all the time, e.g. the slit aperture 6 does not end exactly at the optical axis (See slit 6a in FIG. 2).

In FIG. 1, the rays that pass slit 6a enter a de-collimator lens 7, which, focuses the light at a focus point 8 which is an image of aperture 3. Lenses 5 and 7 are highly corrected to have only negligible spherical aberration so that a nearly ideal spherical wavefront emanates from focal point 8 with slit aperture 6 removed. However, with slit aperture 6 in place, only part of the converging spherical wavefront is directed towards aspherical test surface 9.

The axial position of aspherical test surface 9 can be selectively changed by moving it along the optical axis to be scanned by the wavefront emitted from focus point 8. This is done with the aid of a high-precision mechanical lead 11. The position of the aspherical surface 9 can be measured by one or more distance measuring interferometer(s) (DMI) 24 with the help of a corner cube 12 which is mounted onto the back side of the mount of the aspherical surface 9 and probed by the rays 13 serving as in and outgoing measurement beams. It is even more advantageous to use more than one axis for this measurement. For example, use of three corner cubes, with equal distance from the optical axis and circumferentially spaced apart by 120° from each other, can be made to measure not only the shift, but also the tip and tilt of the surface under test and to automatically correct for that in a closed loop arrangement. Similarly, two plane mirrors with their surfaces parallel to the scan-direction (i.e. the optical axis) might be mounted together with the surface under test and probed by another two axis of a DMI to monitor and compensate for lateral shifts which might occur during the movement of the aspheric surface. It is preferred to use sitemaps that account for five degrees of freedom where rotationally symmetric optics are being measured and six degrees of freedom where non-rotationally symmetric optics are measured so that sufficient control of the movement can be made with high precision.

In the extreme left axial position of the aspherical surface 9 shown in FIG. 1, the ray on the axis together with the ray 14b (the ray 14a is actually blocked by the slit 6a) might initially hit the surface at or near normal incidence and the rays in the very vicinity of the axis. In a certain circle 15, but also in the vicinity of the ray 14b, this condition of normal incidence is violated, but only very slightly. For all the other rays the condition of a perpendicular hit (non-normal incidence) of the surface is violated stronger, so that the out bouncing rays do not coincide with the in bouncing rays. After passing the slit aperture 6 a second time and after de-collimation by lens 5, the rays pass the beamsplitting device 4 and reach a very small aperture (pinhole) 20. Only the rays from the center and the rays from the zone where the rays were exactly normal to the surface can pass the pinhole 20. Directly behind the pinhole is a photodetector 21 sensitive at the used wavelength (preferably a pin-photodiode or a photomultiplier), which senses the interference of the rays from the center and the zone. Thus, all other classes of non-normal rays are spatially filtered from further travel to photodetector 21. It should also be noted that the distance between the pinhole 20 and the photodetector 21 is very small and that the pinhole 20 diffracts the light into a cone. Therefore, the wavefronts can overlap and interfere, despite different incidence directions before the pinhole.

When the surface 9 is not shifted axially and when the slit 6a remains in a constant azimuthal position, the measured intensity might be ideally constant. In the case where there is some air movement within the region where the rays are separated considerably some fluctuations in the measured intensity might be present in the signal due to differences in the refractive index of the moving air and, accordingly, changes in the optical path difference. Mechanical vibrations of the set up do not result in severe intensity modulations, as is usually the case in interferometry because, to a first order, the optical path difference is desensitized in that regard.

When the surface 9 is not scanned axially but the slit aperture 6 is rotated with a frequency $f_{slit}$, the measured intensity of the interference of the rays from the zone and the rays from the center might be modulated if the rotational symmetric aspherical surface is not adjusted correctly, e.g., if the optical axis of the surface 9 does not coincide with the optical axis of the test-set up (given by the focal point 8 together with the vertex of the lens 7). To avoid this, adjustments can be performed by minimizing the amplitudes of the intensity variation. If the surface 9 under inspection has some astigmatism, it may not be possible to bring the amplitude of the intensity variation to zero; nevertheless a minimum modulation indicates correct adjustment.

Figure 2:
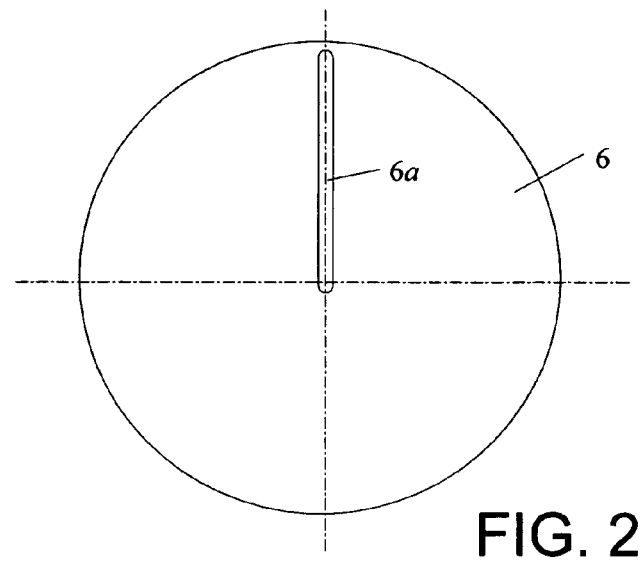
FIG. 2 is a diagrammatic front elevational view of a slit aperture employed in the embodiment of FIG. 1.

The measurement of the surface 9 is performed by scanning the surface under test 9 and at the same time rotating the slit 6. If the scan is started in a position where the focus point 8 coincides with the center of curvature for the apex of the surface, i.e. in the position 10 in FIG. 2, then the surface is probed with two beams, one staying stationary at the center part, the other describing a spiral stating in the center and going all the way out until the very edge of the surface. The number of revolutions at this spiral is given by the number of rotations during the complete scan. This can be adjusted by appropriate setting by the computer, controlling the scan as well as the rotation of the slit-aperture. In FIG. 2, another intermediate position of the aspherical surface, close to the starting position 10, is shown. Here the rays 19a and 19b will later reach the detector and interfere there with the rays from the center. The zone which is probed by these rays is located at 16a and 16b of the surface.

Lead device 11 is driven by a motor 23 to effect axial scanning and is controlled by information from the distance measuring interferometer 24 which is fed to a computer 22 for this purpose. The computer 22 also controls the rotation of the slit aperture 6 and gathers the intensity measurements from the interference measured at detector 21. In addition, computer 22 is provided with suitable instructions in the form of software for implementing algorithms, performs general housekeeping, and serves as an operator interface. It should be pointed out that, as the distance between focus point 8 and surface 9 changes with slit aperture 6 rotating, surface 9 is scanned in spiral fashion with: the spiral sweeping out any number of revolutions in response to programmed instructions. A special case occurs when the whole axial scanning is performed without any rotation of the slit aperture 6 and the geometry of this situation should be clear from FIG. 2. In that case, a semi-diameter is probed on the surface 9. After that, the slit 6a is rotated, and the same scanning is repeated again.

The evaluation of the aspherical profile of the surface 9 for this special case will be described now with the help of FIG. 3. As shown in FIG. 1, the axial scanning starts at the position 10 of the surface and ends after an axial shift of v in the position 9. In the starting position 10, the surface has a distance of $R_0$ from the focal point 8 and in the end-position 9, the distance of the apex of the surface from the focal point 8 is $R_0+v$.

Figure 3:
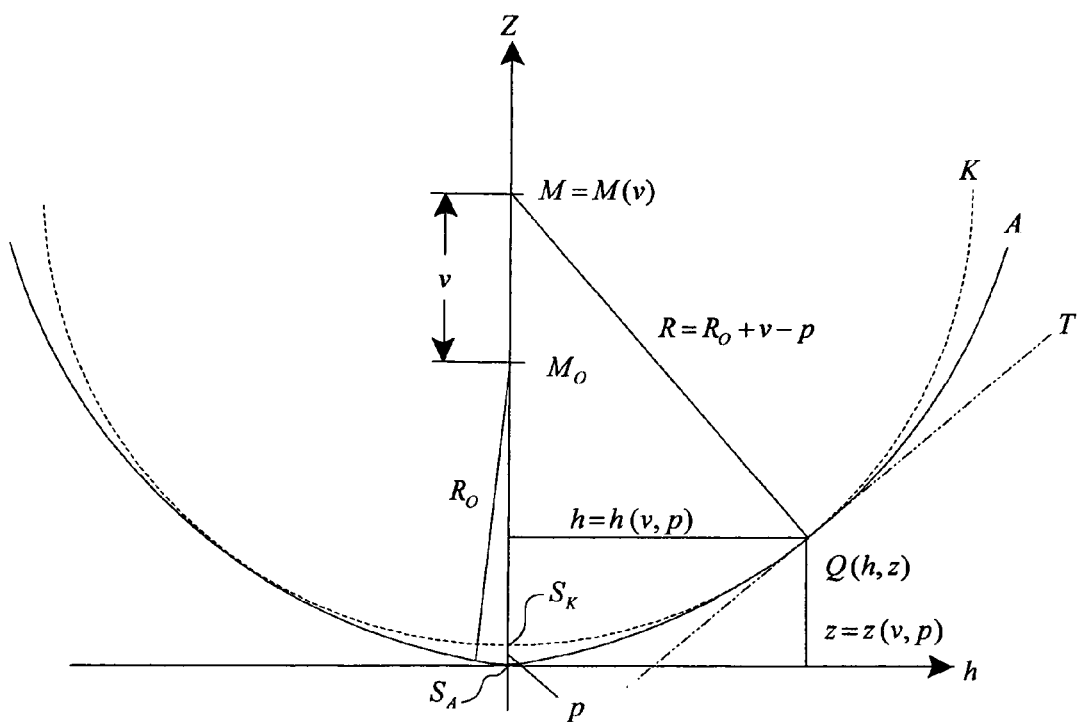
FIG. 3 is a drawing illustrating various parameters and their relationships used in the mathematical evaluation of the aspherical shape of a surface under test using the invention.

In FIG. 3, a cut through the rotationally symmetric aspherical surface 9 is given, establishing an aspherical curve with even symmetry with respect to the z-axis. The following quantities are given:

K is the best fitting circle with its center on the symmetry—axis z to the rotationally symmetric aspherical curve A. This circle touches the aspherical curve A in the point Q(h,z). The normal to the tangent in Q(h,z) (common to K and to A) cuts the z-axis in the point $M(0,R_0+v)$. The distance from Q(h,z) to $M(0,R_0+v)$ is given by the radius $R=R_0+v-p$ of the circle. The circle cuts the z-axis in point $S_K(0,p)$, which is called the apex of the circle. The apex of the aspherical curve is $S_A(0,0)$, i.e., the distance of the apex of the sphere to the apex of the asphere is p.

When the center point $M(0,R_0+v)$ of the circle is shifted the distance v along the z-axis, the point Q(h,z) travels along the aspherical curve; when Q(h,z) coincides with the apex of the aspherical curve $S_A(0,0)$, by definition the shift is v=0. Therefore, the radius of the best fitting circle of the apex of the aspherical curve is $R_0$.

For the following, it is assumed that $R_0$ is known and that the center of the circle is shifted the distance $v=0 \ldots v_{max}$. Under these conditions, the shift v together with the small quantity p is measured. Now it will be shown that it is possible, to compute the coordinates h and z of the point Q(h,z), which defines the aspherical curve for that semi-diameter defined by the azimuthal position of the slit 6a from the knowledge of the functions p=p(v) and $$p'(v) = \frac{d}{dv}p(v).$$

In other words, the aspherical curve is defined in parameter form with the independent parameter v and the two dependent parameters p(v) and p'(v):

$$h=h(v,p,p'); z=z(v,p,p')$$

The equation for the circle can be written as (See FIG. 3):

$$h^2+(R_0+v-z)^2-(R_0+v-p)^2=0 \quad (1)$$

When the center point is shifted an infinitesimal distance dv, the radius of the circle grows by another infinitesimal quantity dp and the new circle cuts the old circle in the common point Q(h,z). The equation for the new circle is:

$$h^2+(R_0+v+dv-z)^2-(R_0+v+dv-p-dp)^2=0 \quad (2)$$

To compute the coordinates z and h, Equations (1) and (2) are solved for the quantities z and h to obtain:

$$z = p + (R_0 + v - p)\frac{dp}{dv} + \left(1 - \frac{1}{2}\frac{dp}{dv}\right)dp$$

The last term can be neglected because it goes to zero for $dp \to 0$. So, finally z becomes:

$$z = p + (R_0 + v - p)\frac{dp}{dv} \quad (3)$$

For h we get:

$$h = (R_0 + v - p)\sqrt{\frac{dp}{dv}\left(2 - \frac{dp}{dv}\right)} \quad (4)$$

It is an important feature of the invention that the axial coordinate z as well as the lateral coordinate h can be computed from the two quantities v and p, which are both measured by interferometry with very high precision. It is not necessary for the detector to resolve the radial coordinate h, where the circle and the aspherical curve coincide at the point of common tangency.

Having described how to calculate the local slope and its position on the aspheric surface through the simple expediency of interferometrically measuring the axial separation between the focus point 8 and the apex of the aspheric surface and the apical distance between the aspheric surface and the radius of the circle of best fit, i.e., p, the topic of how phase measurement can be effected will now be discussed.

FIG. 2 shows the slit aperture 6 in one azimuthal position, and the surface 9 can be scanned axially while aperture 6a remains in this position. Here, the intensity is modulated at detector 21 due to the interference of the beams with the optical path difference between the two interfering beams being given by the quantity, p, i.e., the measured intensity will be:

$$I(v) = A(v) + B(v)\cos\left(2\pi\frac{2p(v)}{\lambda}\right) \quad (5)$$

where A(v) is the mean intensity, B(v) is the modulation and λ is the wavelength used for the measurement. As long as p(v) is a monotonic growing function of the scanning v, then it is possible to capture I(ν) with a high sample rate, for example, with 20 readings per period of the cosine function. This can be done in a number of different ways but only one is described here. When the design of the aspherical surface or wavefront is known, the design values of the quantity p(ν) can be computed and the positions ν, on which intensity values should be captured, can be determined. Thus, the reading of the detector-values are triggered with this quantity, derived from ν. In this case, it is possible to arrange for nearly equal spaced intensity values within one period of the cosine function, and the phase-extraction out of the intensity readings can be done, for instance, with a sliding windowing technique similar to the spatial synchronous detection method described by Womack in Optical Engineering, Vol 23 (1984) 391–395 or by applying one of the well-known compensating algorithms used for temporal phase-shifting (there are a great number of algorithms for this purpose!). The assumptions made are, that the mean intensity A(ν) and the modulation B(ν) are only very slowly varying functions and can be thought of being constant for the number of intensity measurements used within one formula. When a high number of intensity values are captured within one period, it is also possible to normalize for fluctuations in A(ν) and B(ν) by appropriate formulas.

After evaluation of p(ν), the derivative p'(ν) is computed as well by fitting a function (for instance a polynomial or a higher order piecewise spline function) to a portion of p=p(ν) with $v_2 > v > v_0$ and calculating the derivative at $v=v_1$. Then equations (3) and (4) are solved to get the aspherical surface contour for the azimuthal direction θ at which slit 6a was set.

Now slit 6a is rotated by about 179°, and the procedure is repeated for that new azimuthal direction. It should be noted that the scanning can be performed in both directions. After 360 different azimuthal directions, e.g., after 360 scans, the whole surface 9 has been probed with reasonably high density.

Figure 4:
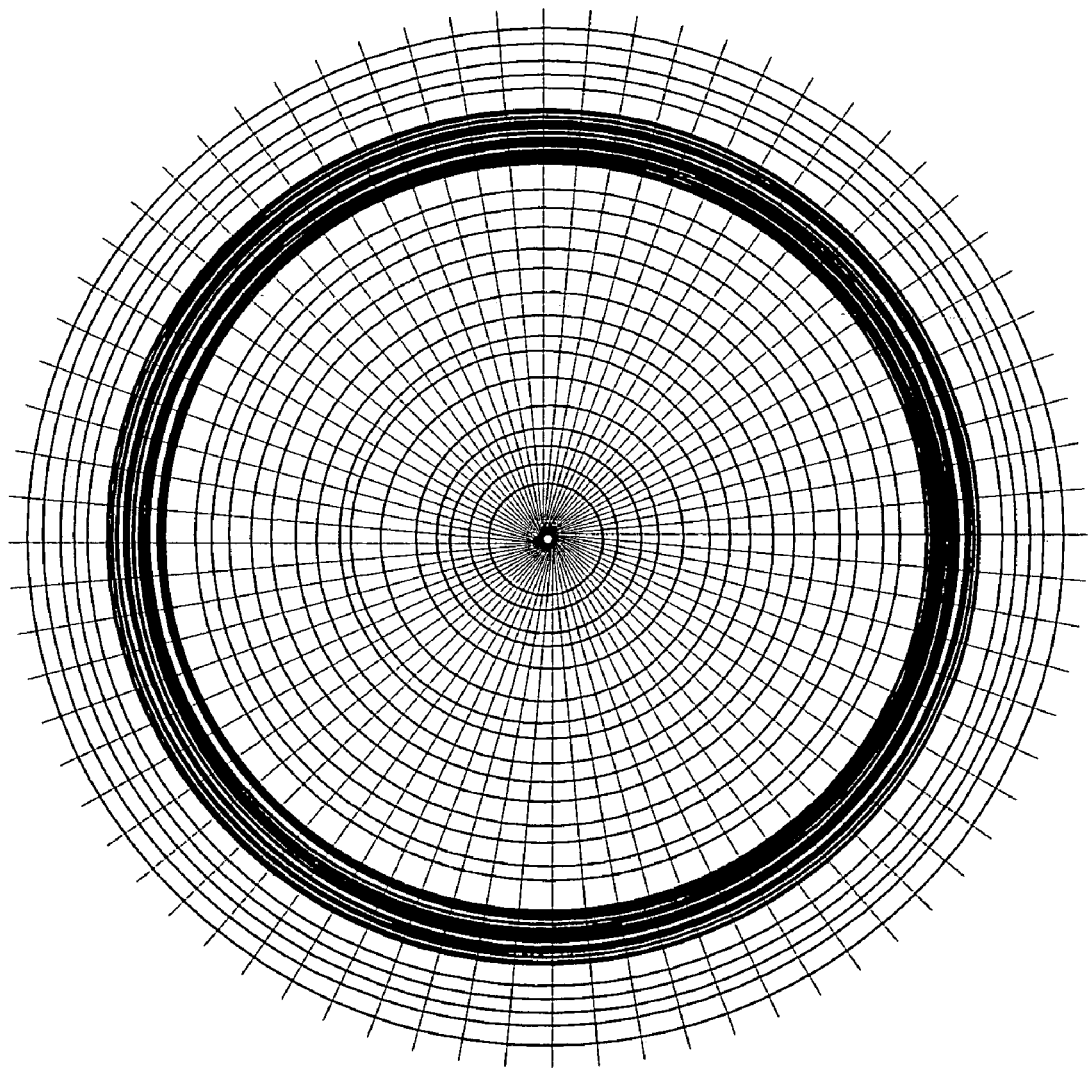
FIG. 4 is a diagrammatic illustration showing traces of the detector ring on the test surface.
Figure 5:
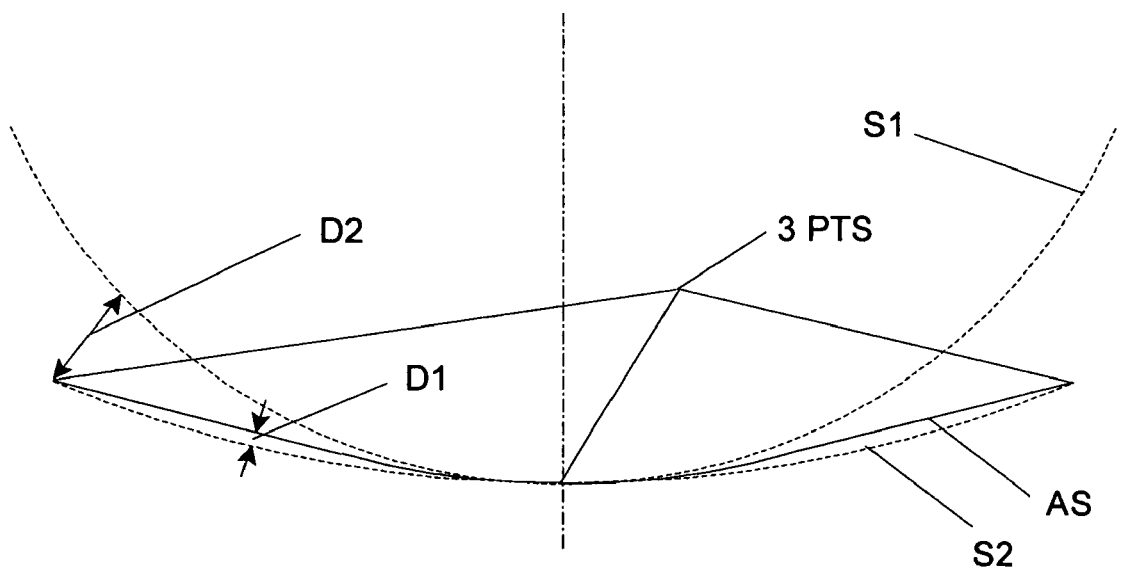
FIG. 5 is a diagrammatic illustration showing a test aspherical curve with a spherical wavefront cutting it in 3 points and the sphere fitting the center of curvature at the apex of the asphere.

Assuming an aspherical deviation of 0.5 mm from the sphere which cuts in 3 points, the aspherical deviation from the sphere which fits the aspherical curve in the apex might be 3 mm, for instance as shown in FIG. 5. Further assuming that use is made of laser light with a wavelength of 0.4 μm with 20 intensity readings per period of the cosine function, then a total of m=20*2*3000 μm/0.4 μm=300000 measurements are needed. This can easily be performed within 3 seconds because 100 kHz does not impose a severe burden for the precise A/D-conversion of the intensity readings with high resolution of 12 bit to 14 bit. For a total of 360 scans then, only 18 minutes are necessary only for capturing the data. With the extra time needed for acceleration and slow down of the movement of the surface 9, it would be reasonable to judge a total measuring time of 30 minutes, which for some purposes could be considered long. FIG. 4 shows traces of the detector ring projected onto the surface 9 and that the resolution azimuthally is dependent on the diameter of the ring and the number of detectors within it. From this it can be appreciated that measurement times can be shortened by using more detectors spaced for higher sampling rates.

To improve measurement speed then, use can be made of multiple detectors instead of the slit aperture 6. To be able to resolve the azimuthal coordinate and at the same time to let the rays from the zone and the rays from the center interfere with each other and automatically select the rays which at any moment are perpendicular to the aspherical surface, pinholes 3 and 20 in FIG. 1 are replaced by a very thin ring-shaped aperture, as described in more detail in U.S. Pat. No. 6,643,024 issued on Nov. 4, 2003 and entitled "APPARATUS AND METHOD(S) FOR REDUCING THE EFFECTS OF COHERENT ARTIFACTS IN AN INTERFEROMETER, the entire contents of which are incorporated herein by reference. This has the benefit, that the azimuthal resolution is preserved, now enabling the use of a multiple detector array in a parallel manner.

Figure 6:
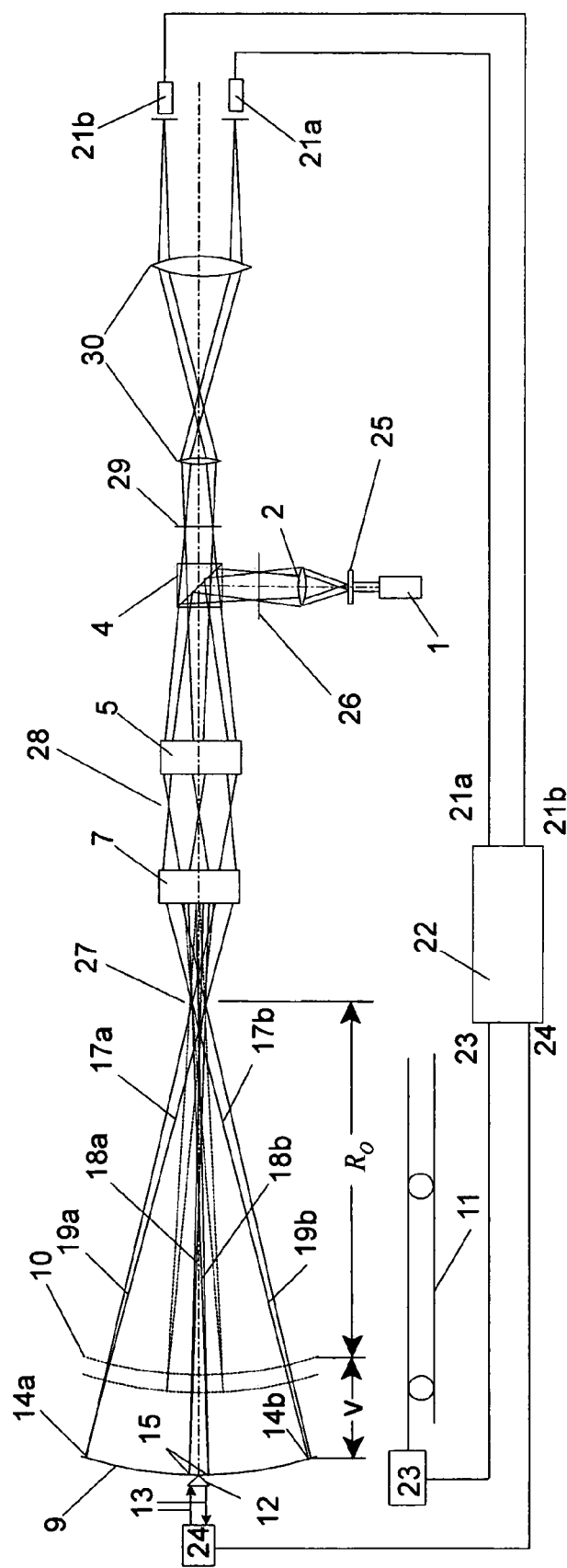
FIG. 6 is a diagrammatic side elevational view of another embodiment for measuring an aspheric surface with a ring-shaped illumination source and a plurality of detectors.
Figure 7:
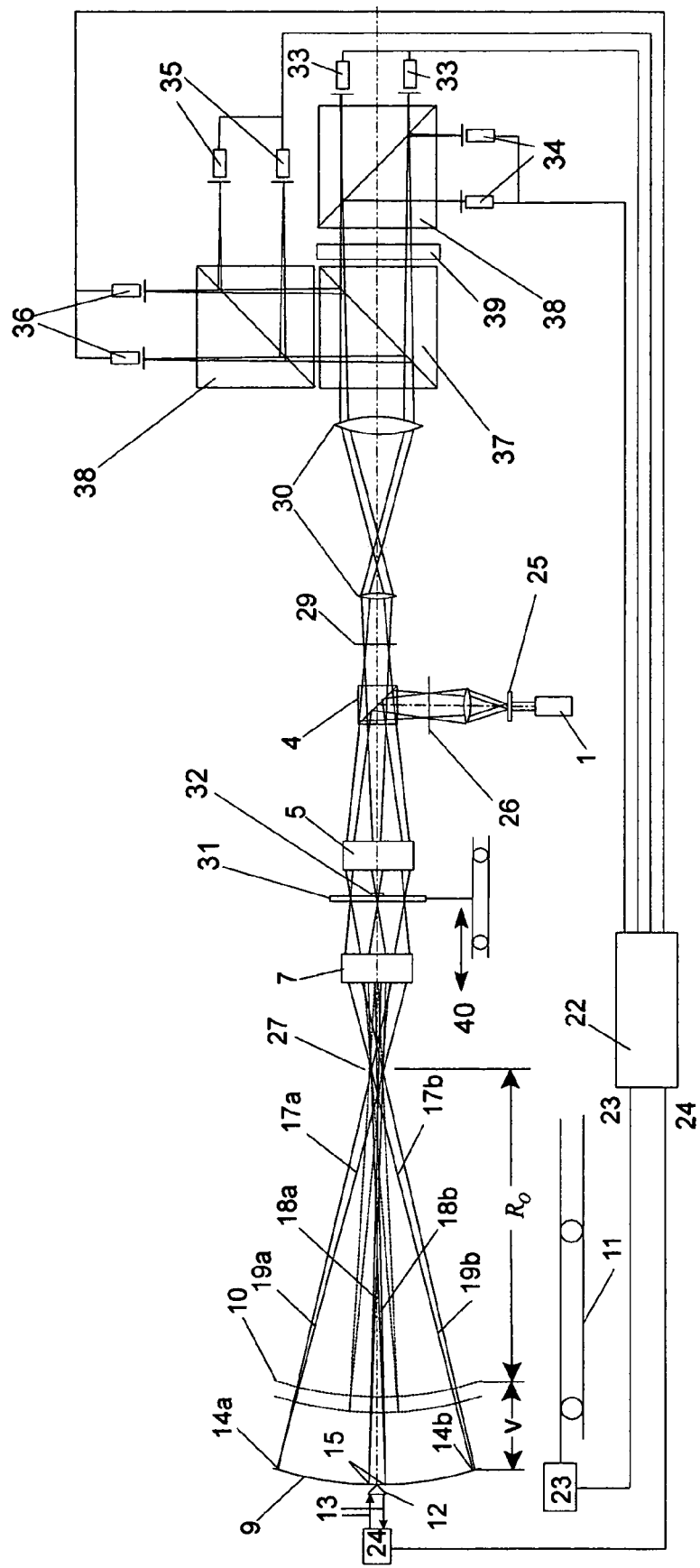
FIG. 7 is a diagrammatic side elevational view of another embodiment of a polarizing version of the invention.

FIG. 7 shows this modified arrangement where common elements have retained their numerical identity from FIG. 1. The beam from the light source 1 is transferred by a holographic optical element 25 and the lens 2 into a ring-shaped form as ring aperture 26. The width of the ring is very small, on the order of 30 μm to 100 μm. The ring 26 is imaged by lenses 5 and 7 into a second, demagnified ring-image 27. The aspherical surface 9 under test images this ring into itself, but with an imaging scale of β=−1, i.e., the image is inverted with respect to the object. It should be noted that only some parts of surface 9 under test are able to perform this imaging; these parts being again the center part and the "zone" where the rays from the center of the circle shaped ring-image 27 are hit by the normals of the surface 9, i.e., the positions 14a and 14b as well as 15 in FIG. 6. These positions are imaged by the lens 7 into the images located at 28 in the intervening space between lenses 5 and 7. The ring at 27 is further imaged by the lenses 7 and 5 into an image located at 29. This is a final conjugate of the ring-aperture 26. In 29, another physical ring-shaped aperture is placed, which acts as a very narrow spatial filter in the radial direction, but has considerable length in the azimuthal direction. In this manner, it is possible to resolve the azimuthal locations on surface 9 under test.

Behind the ring-shaped aperture 29, which has the same physical dimensions as 26, an afocal or telescope system 30 is located, which images the ring 29 onto an arrangement of detectors 21. The detectors 21 (21a and 21b shown) are arranged in a circle in the back focal plane of the second lens of the telescope 30. The magnification of telescope 30 is chosen to optimize the higher number of detectors that can be placed in the ring. If the space is still too small, it might be possible to insert a multifaceted pyramid between the lens 30 and the detectors to reflect the light by 90° and thus allow the detectors to all look towards the optical axis thus establishing a larger circle. Also, it would be possible to use a holographic optical element for this purpose, i.e., simultaneously image the surface 9 in azimuthal direction and the sensing aperture 29 in the radial direction onto detectors 21. Such a holographic optical element is for simplicity has not been included in FIG. 6, but is shown in the later FIG. 9 as element 48.

Each of the detectors 21, has its own phase-measuring electronics, so that their corresponding signals can be processed in parallel, but these are not shown explicitly in FIG. 6 as will be understood by those skilled in the art.

If 60 detectors are arranged in a circle, and the same azimuthal resolution as before is assumed, 360 positions at the circumference of the surface 9 under test should be resolved, and the time necessary will be reduced from 30 min to 30 seconds. To be able to resolve 360 different azimuthal locations with only 60 detectors, it is necessary to rotate the circle of detectors in 6 steps of 10 each. Better resolution can be achieved if the steps are chosen smaller. It will be reasonable to choose steps of 10, which lead to a total of 2160 positions at the full circle. Assuming a diameter for the aspherical surface of 300 mm means that the spacing of measured points is about 0.44 mm at the outer circumference. The spatial density for sampling data in the radial direction depends on the slope of the deviation of the aspherical surface from the sphere. As an average value, with about 600,000 points on the diameter, the spacing is 0.5 μm, i.e., in any case fine enough to locate and detect even very tiny ripples. The much higher sampling density in the radial direction is necessary for precise evaluation of the h, z-coordinates with Equations (3) and (4). Because it is necessary to compute the first derivative of the measured phases, noise will be amplified, and therefore, use of a plurality of measured points in conjunction with a piecewise polynomial fit will improves the precision considerably.

The foregoing methods of detecting the phase values from the intensity measurements, according to Equation (5) have the drawback that variations in the mean intensity A(ν), or in the modulation B(ν), influence the computed values of p(ν). Therefore, it must be assured that such variations will not take place. Due to the high frequency structure that aspherical surfaces might show and due to the "knife-edge like" optical arrangement with a very small ring aperture (like a round slit), this assumption might not be satisfied in all situations. Therefore, it might be necessary to think of alternative ways for phase-extraction from the measurements with the arrangements given with FIGS. 1 and 6.

One approach is to use different polarization stages for the beam at the center of the asphere and the beam at the zone. This can be accomplished by an extra-element inserted in the space between lens 5 and lens 7 in FIG. 6 as shown in FIG. 7 at 31. All other elements in FIG. 7 retain there previous numerical identity. This extra element 31 is a glass plate, where in the center a double refracting element 32 is applied, acting as a quarter-wave plate. This is a very small disc of a double refracting crystal, which is cemented to the very center of the glass plate. Because the lens images the surface under test onto the glass-plate, only a very small part of the center of the aspherical surface acts as a reference for the remaining surface. To keep the glass-plate 31 in focus during the scan, it is necessary to axially shift the glass-plate in a computer controlled manner on a precision slide 40.

When the center part of the beam transverses the quarter-wave plate twice, the linearly-polarized wave has its plane of polarization rotated by 90°. Thus, the two beams are "encoded" by their polarization states, and the relative phase between the beams can be shifted by polarization controlling optical means. There are at least two possibilities which might be applied, which are given in FIGS. 7 and 8.

In FIG. 7, four interferograms are gained with a phase shift of 90° between them. This is a so-called quadrature signal. With a non-polarizing beamsplitter 37, both wavefronts with orthogonal linear polarizations are doubled. Now, a quarter-wave plate 39 in one beam delays the phase of one of the orthogonal polarizations by 90°. After a polarizing beamsplitter 38, the two wavefronts can interfere and produce two intensity patters that are out of phase by 180° to each other. Subtracting the signals sensed with two ring-shaped mounted pin-photodiodes 33 and 34 eliminates the bias A(ν) and a DC-free signal proportional to $$B(v)\sin\left(2\pi\frac{2p(v)}{\lambda}\right)$$

results. The signal of two other detector-rings 35 and 36 are subtracted, as well, and now a signal proportional to $$B(v)\cos\left(2\pi\frac{2p(v)}{\lambda}\right)$$

results. From the arctangent of these signals the desired quantity p(ν) is derived. This technique is applied frequently with distance measuring interferometers and known to have a precision of about 1.0 nm r.m.s.

Figure 8:
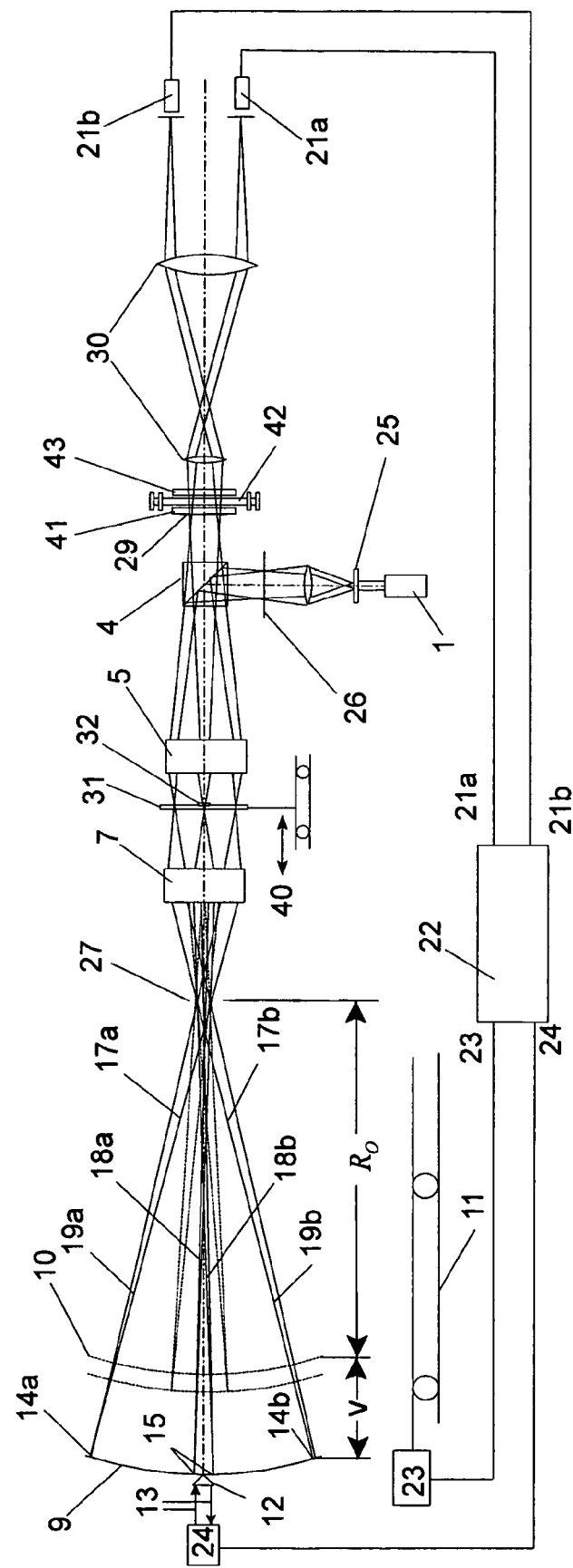
FIG. 8 is a diagrammatic side elevational view of the invention employing polarization encoding and phase-modulation.

In FIG. 8, another possibility is shown, which needs only one detector-ring. Here, the phase-shift must be performed in time, i.e., sequentially rather than parallel. This phase-shift can be accomplished in addition to the phase-shift induced by the scanning procedure and also allows for a measurement in azimuthal direction with the rotation of the part under test without any scanning.

The principle of phase-shifting by polarization is well known: two linearly polarized beams with orthogonal polarization directions transit a properly oriented quarter-wave plate and then transit a rotating, half-wave plate. Along with the rotation of this plate, phase modulation takes place. The beams can finally interfere when they are made the same polarization with the help of a polarizer.

Figure 9:
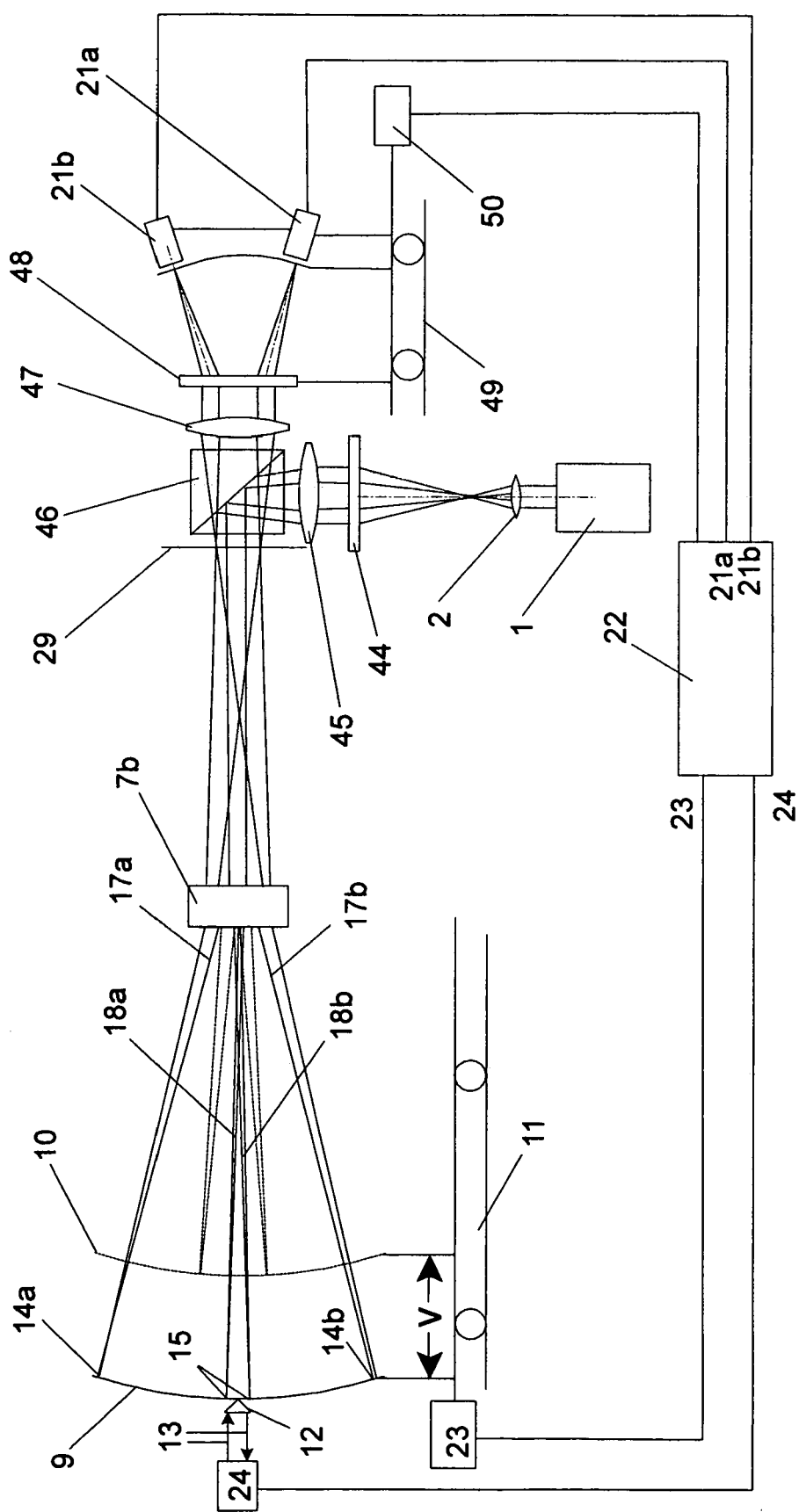
FIG. 9 is a diagrammatic side elevational view of another embodiment of the invention using a diverging lens and corresponding imaging arrangement for testing aspherical surfaces.

FIG. 9 shows a variation of the set-up of FIG. 6. Again, common elements retain their former identity. The ring-aperture 29 is now located between the beam-splitter and a diverging lens 7b. Thus, only one such aperture is necessary, which also simplifies adjustment. The two formerly used collimating lenses 5 and 7 are now replaced by one single diverging lens 7b, which simplifies the set-up further. Because no intermediate focus 27 is used in the apparatus of FIG. 10, the air-path between the surface 9 under test and the diverging lens 7b is shorter. The main difference is in the optical scheme for the imaging surface 9 under test onto the detector-ring in azimuthal direction and of the sensing aperture in the radial direction. Consequently, this imaging is a special kind of anamorphic imaging, which can be performed with the help of a holographic optical element, similar to a Fresnel zone plate. This element is shown as 48 in FIG. 9. It has no power in azimuthal direction. Therefore, the lens 47 together with lens 7b forms a sharp image of the surface 9 onto the detector ring in azimuthal direction, and the ring-shaped aperture 29 acts as the aperture for that image. In the radial direction, the holographic optical element 48 is provided with enough power to image the ring-aperture 29 onto the detector-ring. Here, the focal length of the element 48 is given by the distance of the detector-ring from element 48. Together with this imaging (first diffraction order), a magnification of the diameter is accomplished. The holographic element 48 and the detector ring must be refocused when the surface is scanned. This is done with a computer-controlled precision slide 49 and a motor 50.

Figure 10:
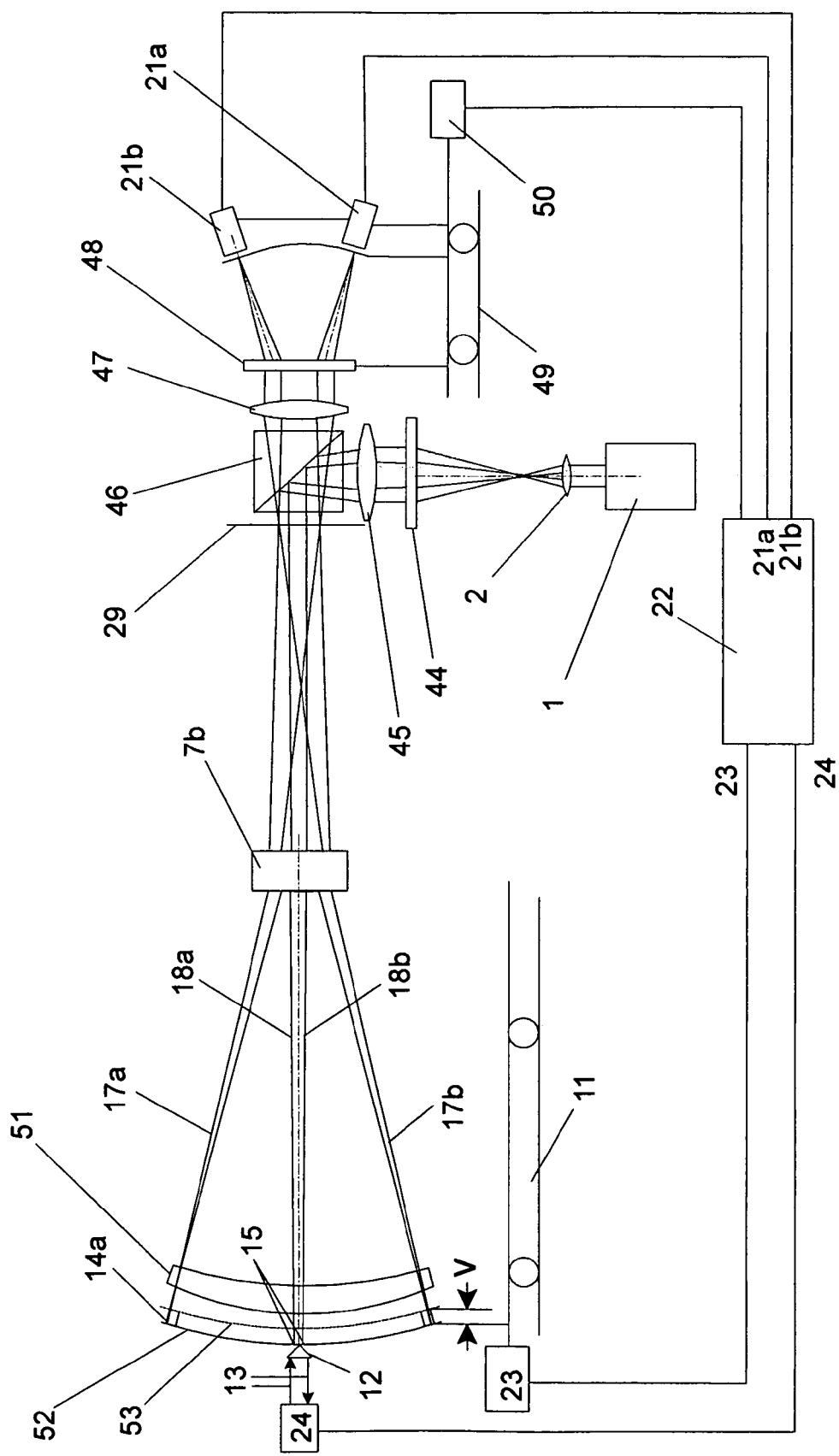
FIG. 10 is a diagrammatic side elevational view of an embodiment of the invention configured to test the aspherical wavefront transmitted from a lens.

In FIG. 10, the testing of an aspherical wavefront is shown, which is delivered by a lens 51. Lens 51 is probed by a spherical wave and a spherical auto-collimation mirror. The auto-collimation mirror is scanned a small distance behind the lens 51, from an initial position 52 to a final position 53. There exist a great variety of different configurations for the conjugates (object-point and image-point of the lens 51), which differ considerably in aspherical departure from the transmitted wave, which the lens adds to the impinging spherical wave. This could be used to minimize the aspherical departure and lead, therefore, to the highest measurement precision because the tolerances for correctly adjusting the test set-up are also lowered in that case. But, it is also possible to test the lens 51 in a configuration similar to the one in which it is used later in an optical system. It can be stated that, in principle, the combination "lens+spherical auto-collimation mirror" acts optically similar to an aspherical mirror.

Figure 11:
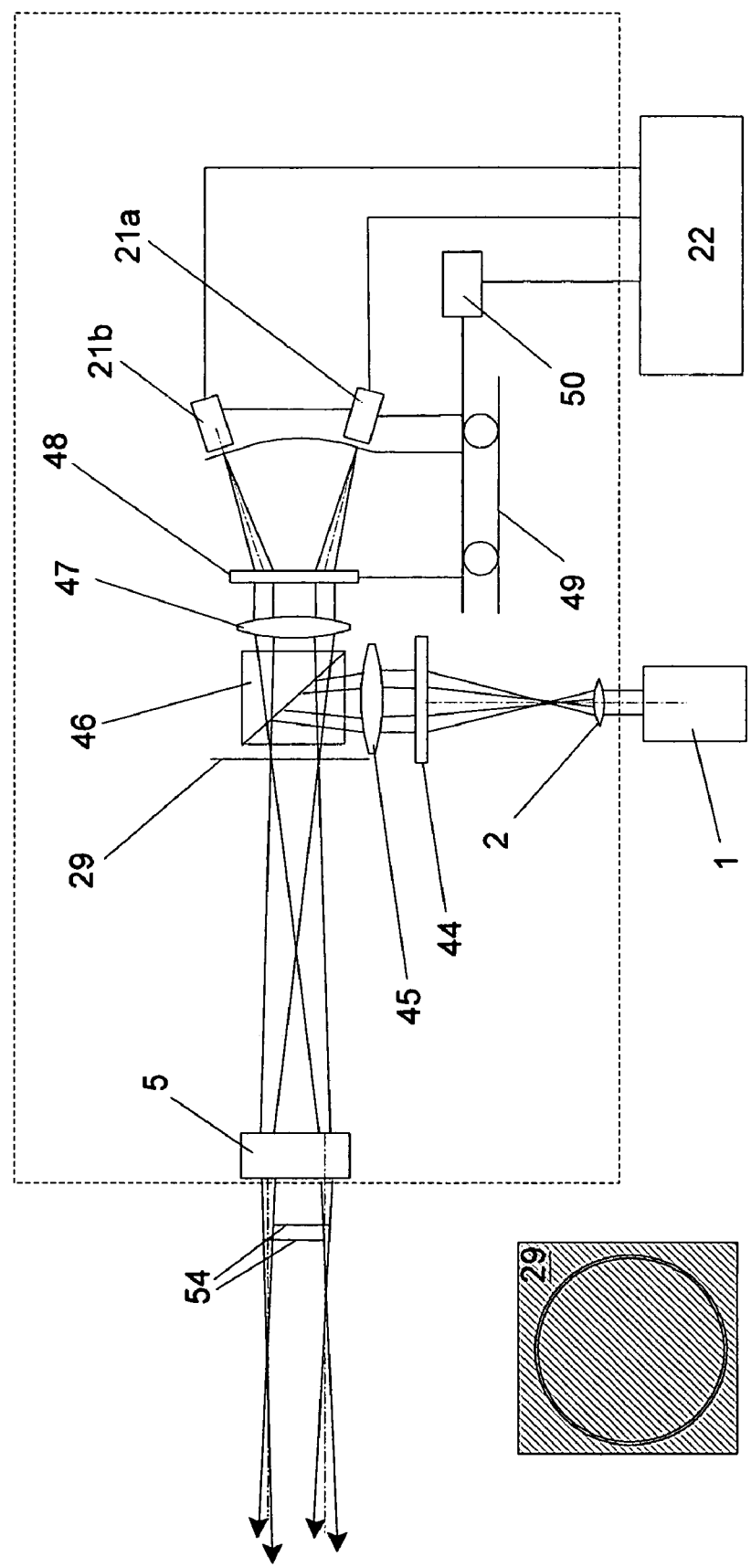
FIG. 11 is a diagrammatic side elevational view of an interferometer main-frame with ring-aperture and detector ring showing a wavefront plane wavefront leaving it.

In FIG. 11, a modular embodiment of the concept is shown. To allow for different configurations, it is useful to build an instrument which can act very similar to the mainframe of a conventional Fizeau-interferometers housing detectors, the beam-splitter and the ring-aperture, as well as means for focusing. The optical interface to further optics is by a cone of plane waves 54, which are produced by a collimating lens 5 with the ring-shaped aperture in its focus. The light source 1 and computer 22 and electronics might be outside of the housing of this main-frame for thermal reasons.

In the following FIGS. 12 through 23 different configurations which might be placed in front of the mainframe of FIG. 11 are shown. These configurations deliver solutions for measurement tasks as:

Testing (i.e., finding the wavefront-errors to be used as a correction-matrix in the final application of the null-lens) the refractive null lens or the diffractive CGH;

Testing the aspherical surface;

Calibrating the test-set-up with the help of an aspherical surface, which is known a priori. This possibility is described later in greater detail;

Qualifying a refractive null-lens, as it is described in and needed for the task described in U.S. Provisional Patent Application No. 60/299,512 filed in the name of Carl A. Zanoni on Jun. 20, 2001 for METHOD FOR MEASURING ASPHERICAL OPTICAL SURFACES and later converted in U.S. patent application Ser. No. 10/152,075 filed in the name of Carl A. Zanoni on May 21, 2002 for APPARATUS AND METHOD FOR MEASURING ASPHERICAL OPTICAL SURFACES AND WAVEFRONTS; now U.S. Pat. No. 6,771,375 issued on Aug. 3, 2004, and Testing lenses in transmission in different configurations.

Figure 12:
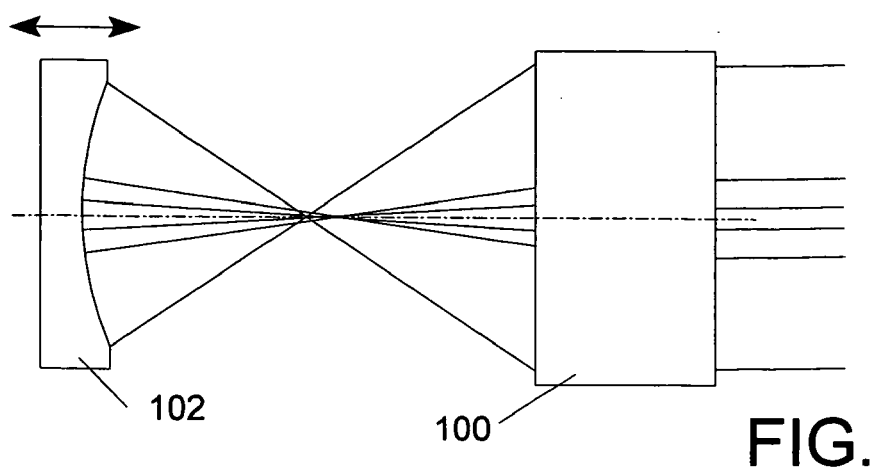
FIG. 12 is a diagrammatic side elevational view showing testing of the refractive null lens or diffractive CGH.

FIG. 12 shows an arrangement employing a converging refractive null lens or diffractive CGH 100 and a converging spherical mirror 102 for testing the refractive null lens or CGH.

Figure 13:
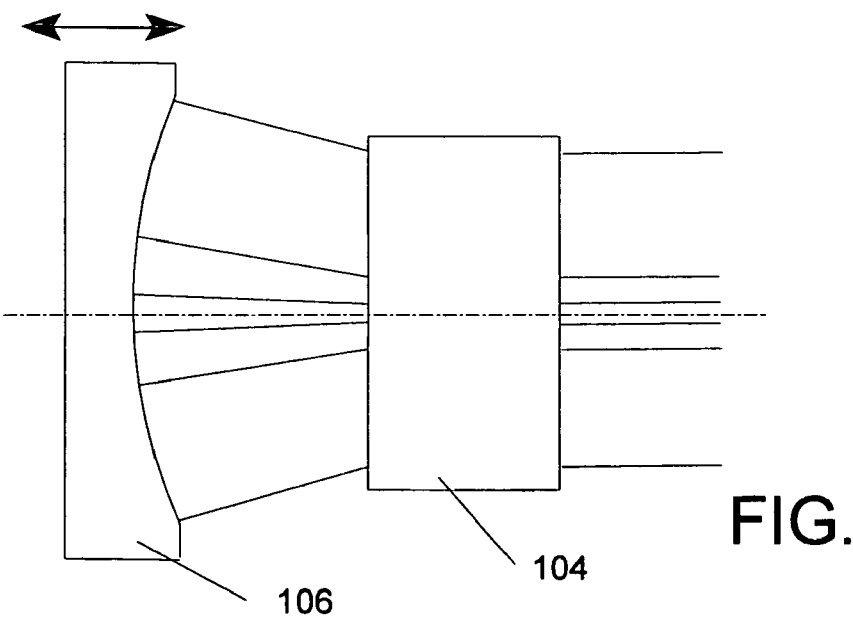
FIG. 13 is a diagrammatic side elevational view showing testing of the refractive null lens or diffractive CGH.

FIG. 13 shows an arrangement employing a diverging refractive null lens or diffractive CGH 104 and a converging spherical mirror 106 for testing the null lens or CGH.

Figure 14:
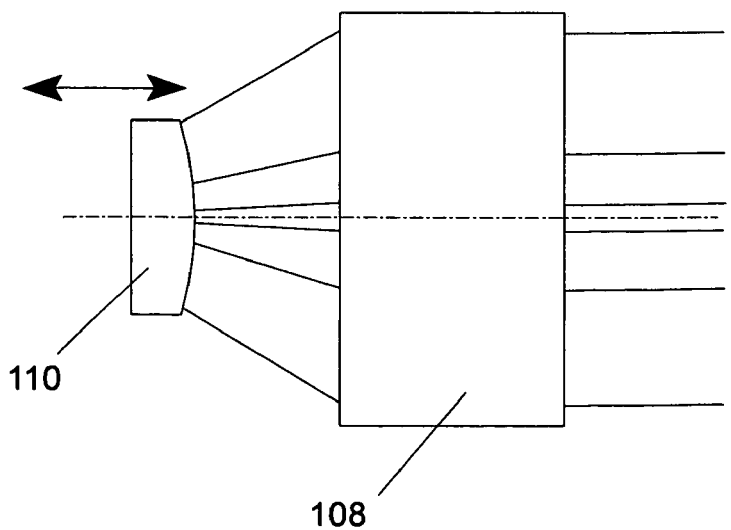
FIG. 14 is a diagrammatic side elevational view showing testing of the refractive null lens or diffractive CGH.

FIG. 14 shows an arrangement employing a converging refractive null lens or diffractive CGH 108 and a diverging spherical mirror 110 for testing the null lens or CGH.

Figure 15:
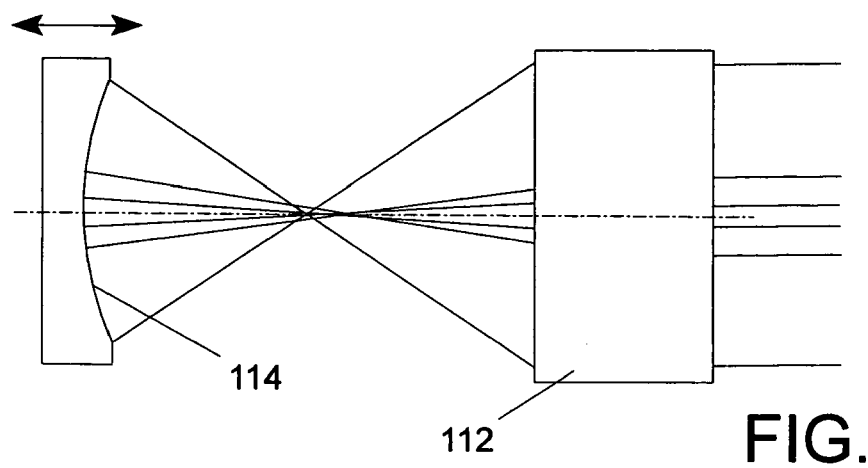
FIG. 15 is a diagrammatic side elevational view showing testing of the aspherical surface or calibrating the set-up.

FIG. 15 shows an arrangement employing a decollimator 112 and an unknown aspherical surface or known asphere 114 for testing the unknown aspherical surface or calibrating the set up.

Figure 16:
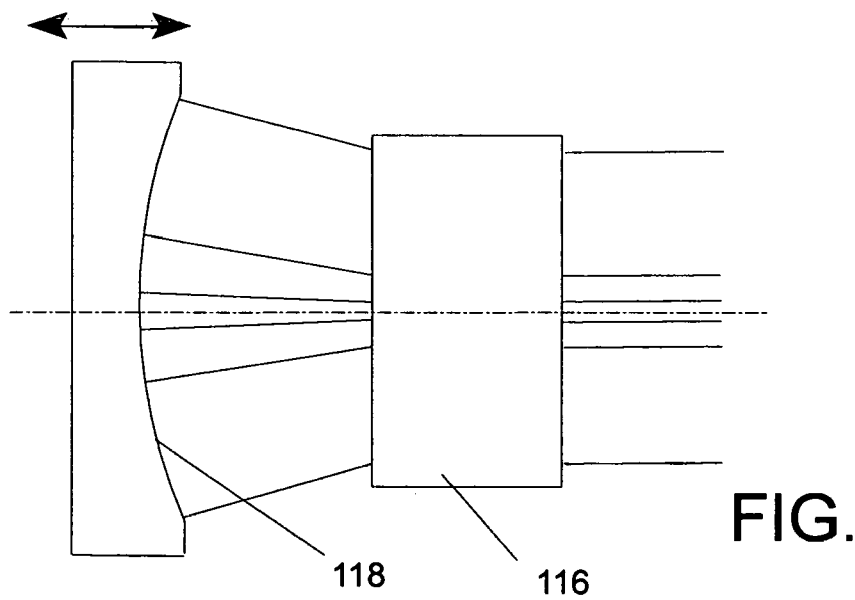
FIG. 16 is a diagrammatic side elevational view showing testing of the aspherical surface or calibrating the set-up

FIG. 16. shows an arrangement employing a diverger lens 116 and an unknown converging aspherical surface or known asphere 118 for testing the unknown aspherical surface or calibrating the set-up.

Figure 17:
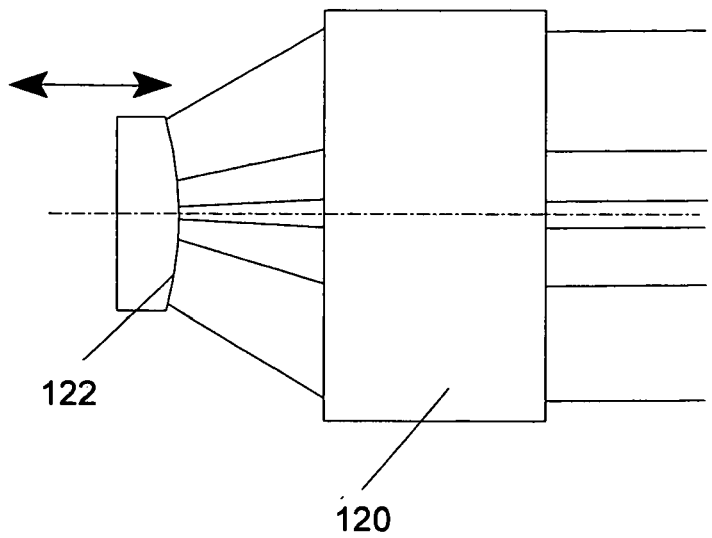
FIG. 17 is a diagrammatic side elevational view showing testing of another aspherical surface or calibrating the set-up

FIG. 17 shows an arrangement employing a decollimator 120 and an unknown aspherical surface or known asphere 122 for testing the unknown aspherical surface or known asphere for calibration of the set-up.

Figure 18:
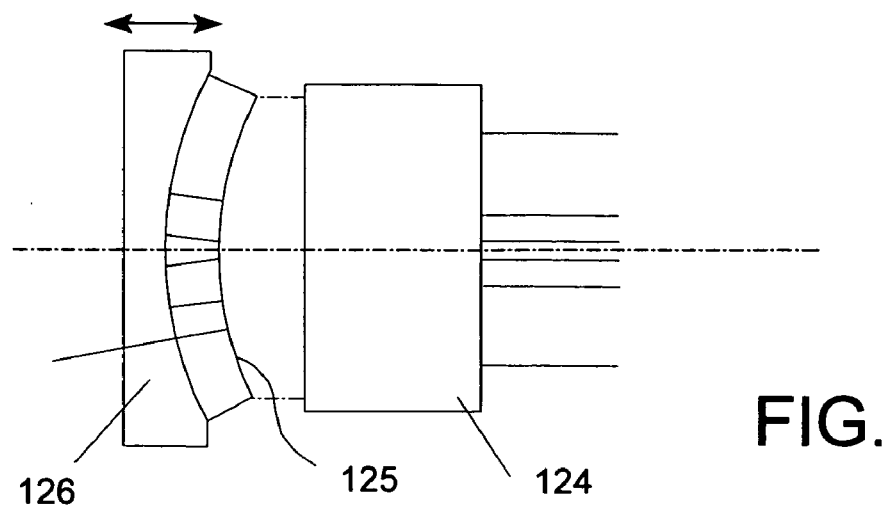
FIG. 18 is a diagrammatic side elevational view showing the qualification of a reflective null lens.

FIG. 18 shows an arrangement in which a reflective null lens 124, a spherical mirror 126 and an aspherical reference surface 125 are used to qualify the reflective null lens 124.

Figure 19:
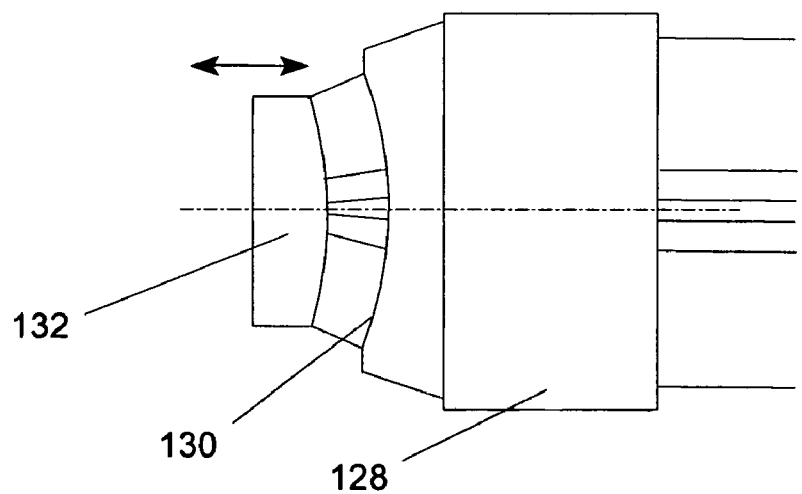
FIG. 19 is a diagrammatic side elevational view showing the qualification of another a reflective null lens.

FIG. 19 shows an arrangement in which a reflective null lens 128, an aspherical reference surface 130 and a spherical mirror 132 are used to qualify the reflective null lens 128.

Figure 20:
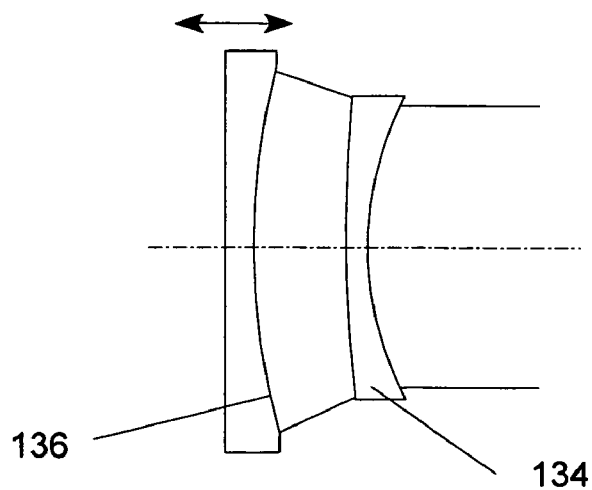
FIG. 20 is a diagrammatic side elevational view illustrating measurement of the aspherical wavefront of a lens in transmission with one conjugate at infinity.

The arrangements of FIGS. 18 and 19 while being described as for use in the "qualification of a reflective null lens", which is perfectly suited for measurement of a master for an aspherical Fizeau, can be modified for more general use. The elements 126 or 132 can be the aspheric test surfaces, as well, to test aspherical surfaces on lenses. The surfaces 125 or 130 are then spherical Fizeau reference surfaces. The Fizeau reference surface 130 is concave as in case of FIG. 19 but the test surface can then be concave, as in FIG. 18. In this case, there is a real focus point in between similar to that shown in FIG. 15 where the decollimator 112 would be replaced by a transmission asphere, a decollimator carrying a spherical Fizeau reference surface. Thus, the two modified configurations of FIG. 18 and 19 would have the surfaces 125 and 130 as spheres and the surfaces 126 and 132 are aspheres. Moreover, it would also be possible to modify FIGS. 18 and 19 such that the surfaces 126 and 132 are spheres and the surfaces 125 and 132 are aspheres, which then makes the systems 124 and 128 operate as aspherical Fizeaus. FIG. 20 shows an arrangement in which a lens 134 with negative power in transmission and a spherical mirror 136 may be used to measure the aspherical wavefront of the lens in transmission with one conjugate at infinity.

Figure 21:
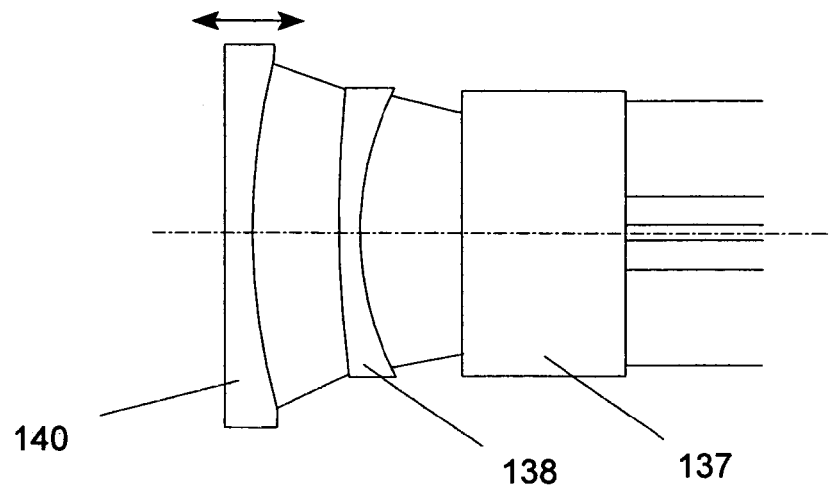
FIG. 21 is a diagrammatic side elevational view showing the measurement of an aspherical wavefront of a lens in transmission with conjugates optimized for minimal aspherical departure.

FIG. 21 shows an arrangement in which a diverger 137, a lens 138 with negative power in transmission, and a spherical mirror 140 are used to measure the aspherical wavefront of the lens in transmission with conjugates optimized for minimal aspherical departure.

Figure 22:
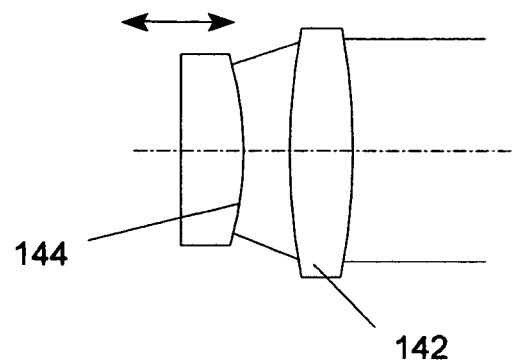
FIG. 22 is a diagrammatic side elevational view showing measurement of the aspherical wavefront of a lens in transmission with one conjugate at infinity.

FIG. 22 is an arrangement in which a lens 142 having positive power in transmission and a spherical mirror may be used to measure the aspherical wavefront of the lens in transmission with one conjugate at infinity.

Figure 23:
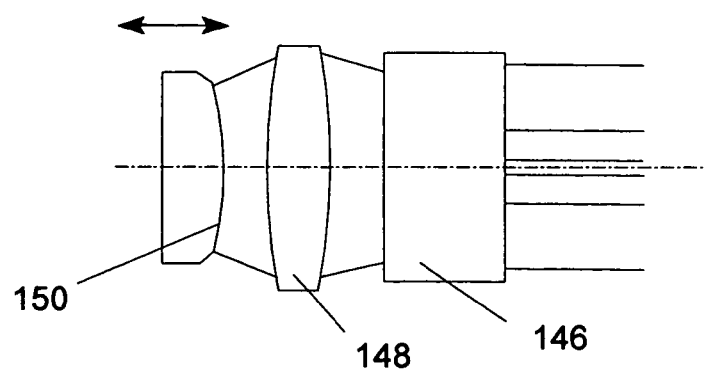
FIG. 23 is a diagrammatic side elevational view illustrating measurement of the aspherical wavefront of a lens in transmission with conjugates optimized for minimal aspherical departure.

FIG. 23 is an arrangement in which a diverger 146, a lens 148 having positive power in transmission, and a spherical mirror 150 can be used to measure the aspherical wavefront of the lens 148 with conjugates optimized for minimal aspherical departures.

In all the foregoing embodiments, it is possible to scan over the surface or wavefront in the radial direction by axially shifting one auto-collimation element. Together with this shift, the heterodyne frequency for the phase-measurement is delivered automatically. In all cases other than those of FIGS. 18 and 19, the coherence length of the light-source can be as small as the aspherical departure, and there is no need to adjust optical path length for the beams to make them interfere. Also, due to the nearly common path principle, sensitivity against vibrations is reduced considerably, which is important for the realization of predictable monotonic and smooth phase-function in time. Also, the sensitivity to air-turbulence within the measuring volume is reduced because only air-gradients within this volume are harmful whereas, in the case of a Twyman-Green set up, the differences in both arms are harmful, and these are much bigger because of the smaller correlation of the air in both arms. Also, as is shown in FIGS. 12 to 23, it is demonstrated that sensible ways for solving the measurement problems with a minimal air path always exist.

Three possibilities for calibrating test set-ups are shown in FIGS. 15, 16 and 17. In these, the underlying concept is to scan a known aspherical surface in front of the de-collimator or diverging lens and to use this now known aspherical surface afterwards to assist in the measurement of an unknown aspherical surface. This way, the measurement is based ultimately on the surface of an a priori known asphere.

The measurement procedure and the algorithm described with Eqs. (3) and (4) are only intermediate steps because the surfaces can not be optically compared to each other in a direct manner. The scanning-procedure acts as a "transformer" between the surfaces. Again, the decollimator 112 of FIG. 15 can be replaced by a transmission asphere, i.e., a decollimator carrying a spherical Fizeau reference surface.

Therefore, the final accuracy of the measurements is based on the quality with which a special aspherical surface, like a parabola, can be performed. It should be mentioned that the measurement of a parabola can be related to the measurement of a plane and a sphere, and both can be performed absolutely. Another candidate for calibration purposes is a hyperbola, which can be tested with the help of two spheres. Also, a lens in transmission together with a sphere for auto-collimation can be used. In addition, lenses exist which deliver a stigmatic wavefront in a special configuration (and can be tested with solely spherical wavefronts) and deliver a strong aspherical wavefront in different configuration, which can be used for calibration.

Figure 24:
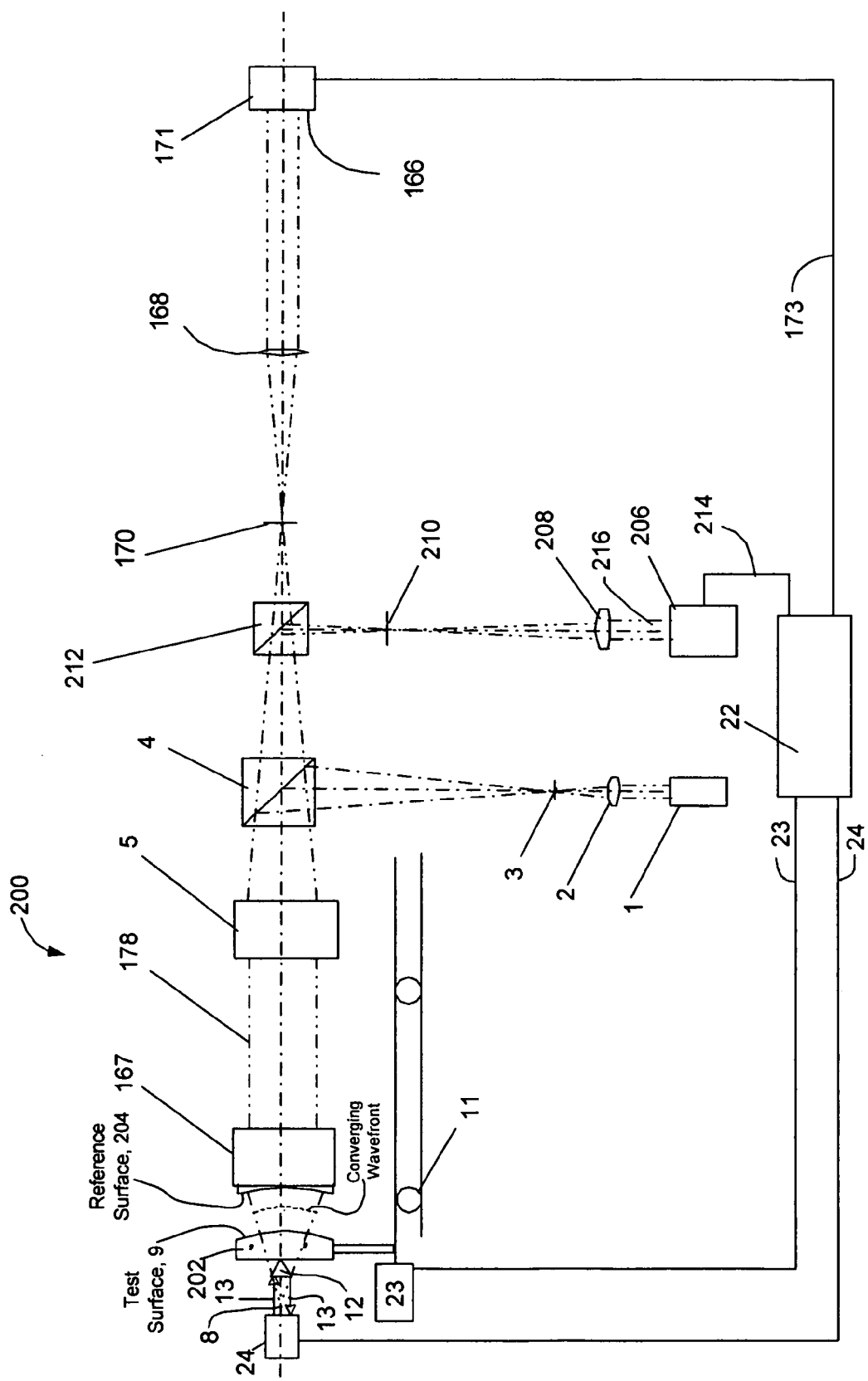
FIG. 24 is a diagrammatic side elevational view illustrating an embodiment of the invention that employs a spherical reference surface and associated imaging optics to enable the measurement of spherical, aspheric, and aspheric surfaces with multiple zones, where the latter two may have mild or steep surfaces.
Figure 25:
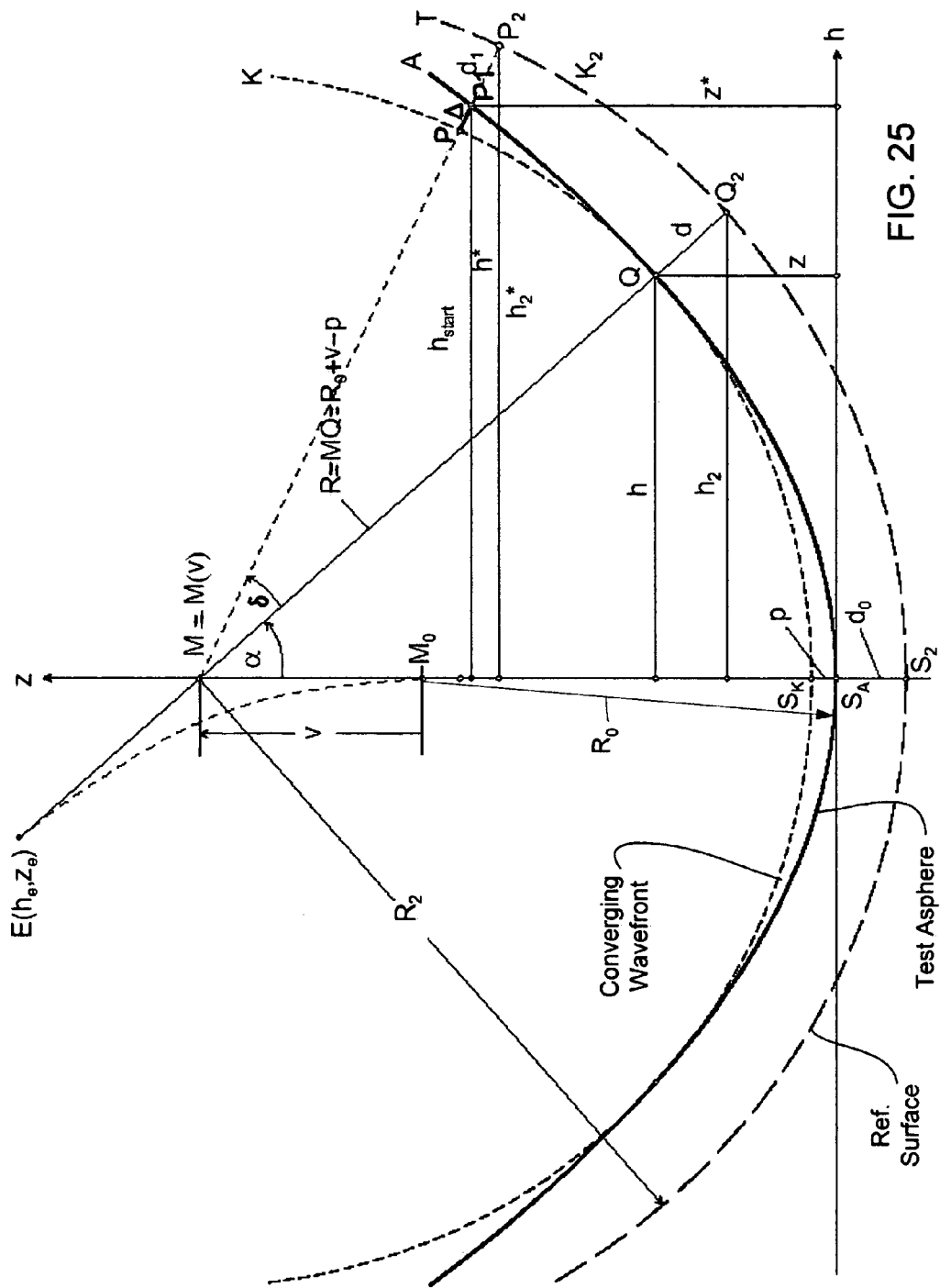
FIG. 25 is a drawing illustrating various parameters and their geometric relationships used in the operation of the embodiment of FIG. 24.

Reference is now made to FIGS. 24 and 25 where FIG. 24 shows a diagrammatic side elevational view illustrating an embodiment of the invention that employs a spherical reference surface 204 and associated imaging optics to enable the measurement of spherical, aspheric, and aspheric surfaces with multiple zones where the later two may have mild or steep surfaces. More specifically, the embodiment of FIG. 24 is a scanning interferometer 200 configured as a Fizeau for measuring the deviation of the surface of an asphere 202 from its nominal design shape in a direction normal to the surface as a function of the surface height, i.e., $\Delta n = \Delta n(h)$. FIG. 25 illustrates various parameters and their geometric relationships used in the operation of scanning interferometer 200.

As best seen in FIG. 24, scanning interferometer 200 has many parts in common with the embodiment of FIG. 1, and the parts in common with those of FIG. 1 continue to be identified in FIG. 24 with the same reference numerals as were used to identify them in FIG. 1. This embodiment, however, differs in significant structural and operational ways from that of FIG. 1. The principal structural differences include the use of a spherical reference surface 204 as the last surface of a de-collimator 167 (transmission sphere), the use of a normal sized aperture 170 (about 2 mm); and the use of two two-dimensional CCD cameras, 171 and 206, or the like, that provide signals 173 and 214 containing phase information to computer 22. Of the two cameras, camera 171 is of lower magnification than that of 206 and is used primarily for imaging fringes from off-axis zones, while camera 206 is adapted to view near the axis, where fringe density is higher, and therefore requires higher magnification to resolve fringe differences and identify initial zones. To view along the axis, camera 206 is provided with a longer focal length lens 208 that looks along the axis through aperture 210 via a beamsplitter 212. The spherical reference surface 204 acts as part of a Fizeau cavity, which is unlike the embodiments of before. However, as before, an image 8 of pinhole 3 is formed forward of spherical reference surface 204. The aspherical surface under test is again designated at 9 and may be mildly aspheric, mildly multiply aspheric, or even spherical. What constitutes a mildly aspheric surface is governed by the ability of the detector to resolve resultant fringes with sufficient spatial resolution for meaningful results, and may, for example, be on the order of 2 mm departure from a sphere.

An intermediate image of the surface under test occupies the intervening space 178 located between collimating lens 5 and de-collimating lens 167, and a final image of the surface under test is formed on CCD-camera 171 via aperture 170 and following lens 168 and on CCD camera 206 via aperture 210 and following lens 208, as the case may be. The images on the cameras are present simultaneously and the image information is processed simultaneously as, well. On CCD-camera 171 the final, image is designated at 166, and on camera 206, it is designated as 216.

As before, a surface under test 9 is moved relative to image point 8 via lead device 11 driven by a motor 23 to which test element 202 is coupled. A converging spherical wavefront of known geometry is focused at image point 8. The converging spherical wavefront emanating from reference surface 204 contacts the surface under test 9 at one or more zones, and as a result, interferograms are formed at 166 on CCD camera 171 and at 216 on CCD camera 206 with resultant signals 173 and 214 passed to computer 22 as the distance between the surface under test 9 and point 8 is made to vary. If required, computer 22 may be replaced with separate computers that are configured to process signals 173 and 214 separately, and is programmed in a well known manner with suitable software to carry out control, analysis, housekeeping, and communication functions, as well as to implement the various algorithms to be described. In this connections, the CCD cameras 171 and 206 may be shifted axially during the scan of the aspherical surface to maintain optimal imaging conditions of aspherical surface 9 onto their respective CCD chips. Note that the tolerances for this focusing are not stringent because only rays with normal incidence onto the aspherical surface are used for the measurement, a distinct advantage compared with other methods.

Where it is important to reduce the effects of coherent artifacts, the illumination system may be replaced by a ring shaped source such as that shown and described in connection with FIGS. 6, 7, and 8 or as more fully described in U.S. Pat. No. 6,804,011 issued on Oct. 12, 2004 and U.S. Pat. No. 6,643,024 issued on Nov. 4, 2003, the entire contents of both of which are incorporated herein by reference.

Having described the major structural differences with this embodiment, its principal and method of operation will now be described with reference to FIGS. 25–29.

When mild aspherical surfaces are illuminated with a spherical wavefront in a Fizeau cavity, provided as here, with a spherical reference surface 204, relatively broad zones in the interferogram show up away from the axis, where the fringe density is low enough to be resolved and measured with CCD-camera 171 with a sufficiently high number of pixels. Near the axis, where the fringe density is higher, camera 206, whose magnification is 10, or more, times higher than that of camera 171, looks at a near axis zone that is only 10 percent of the size of the image viewed by camera 171. Phase measurements of the interferogram can be done in a quite conventional way by phase-shifting with the help of tuning the wavelengths of the diode-laser source 1 or by changing the position of test surface 9 in front of the reference surface 204 by a small amount of, for instance, $\lambda/8$ per camera frame. This latter principle is superior because then a stabilized light source of very well known wavelengths is used to achieve the absolute accuracy of the measurement of p. Because the asphere is mild and the zones are broad, the axial scan can be done with a lower number of axial steps that may be on the order of 500 to 1000 compared to about 100,000 for the previous approaches where the beams from the two zones on the asphere are made to interfere with each other. Preferably, multiple phase shifting is preformed in the manner described in U.S. Pat. No. 6,717,680 issued on Apr. 6, 2004 in the name of Michael Kuchel, et al. with the title APPARATUS AND METHOD FOR PHASE SHIFTING INTERFEROMETRY, the contents of which are incorporated herein by reference It will be appreciated that, when the interferograms thus formed are analyzed, the phase in the center of the surface and also in the zone, where the rays are nearly perpendicular, the departure from the fitting sphere is either concave or convex as illustrated in FIG. 25, i.e., there is an inflection point.

Figure 26:
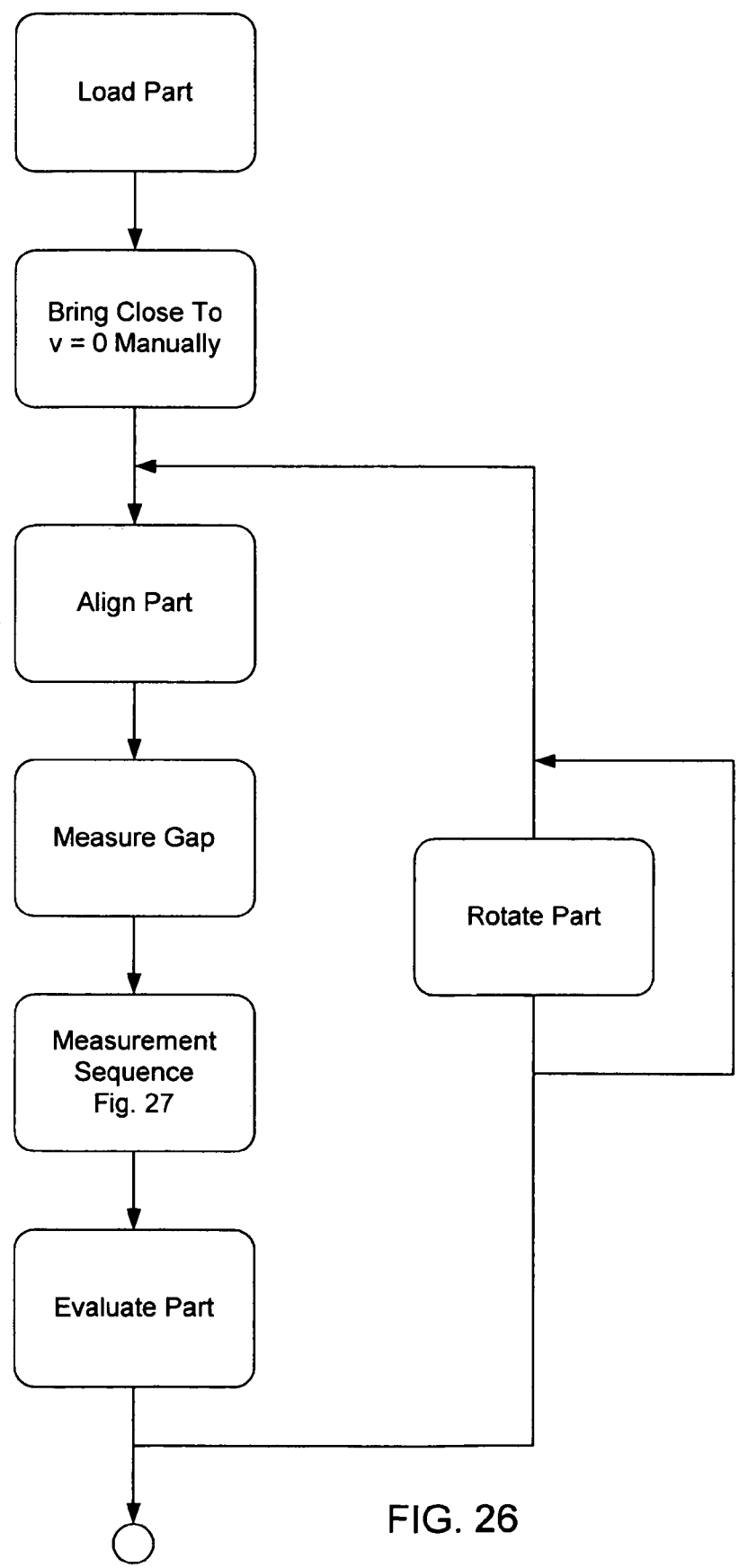
FIG. 26 is a high level flow chart broadly showing various steps in carrying out a method of the invention in making multiple scanning measurements of a test surface.
Figure 27:
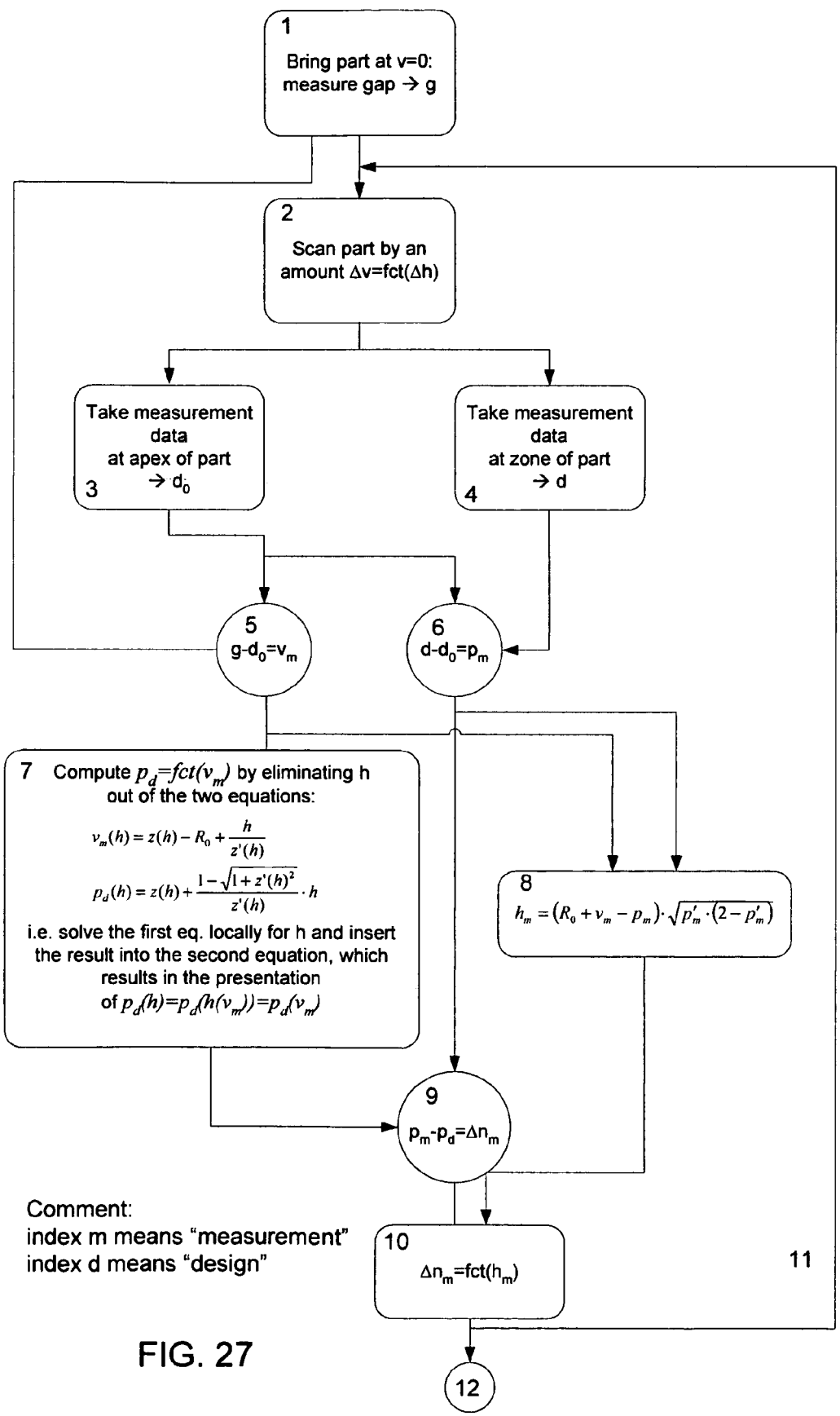
FIG. 27 is a flow chart illustrating various steps in practicing a method for measuring the deviation, $\Delta n$, of an aspheric surface normal to the surface as a function of polar coordinates, h and $\theta$ from two phase measurements, $d_0(0,0)$ and $d_h(h,\theta)$.
Figure 28:
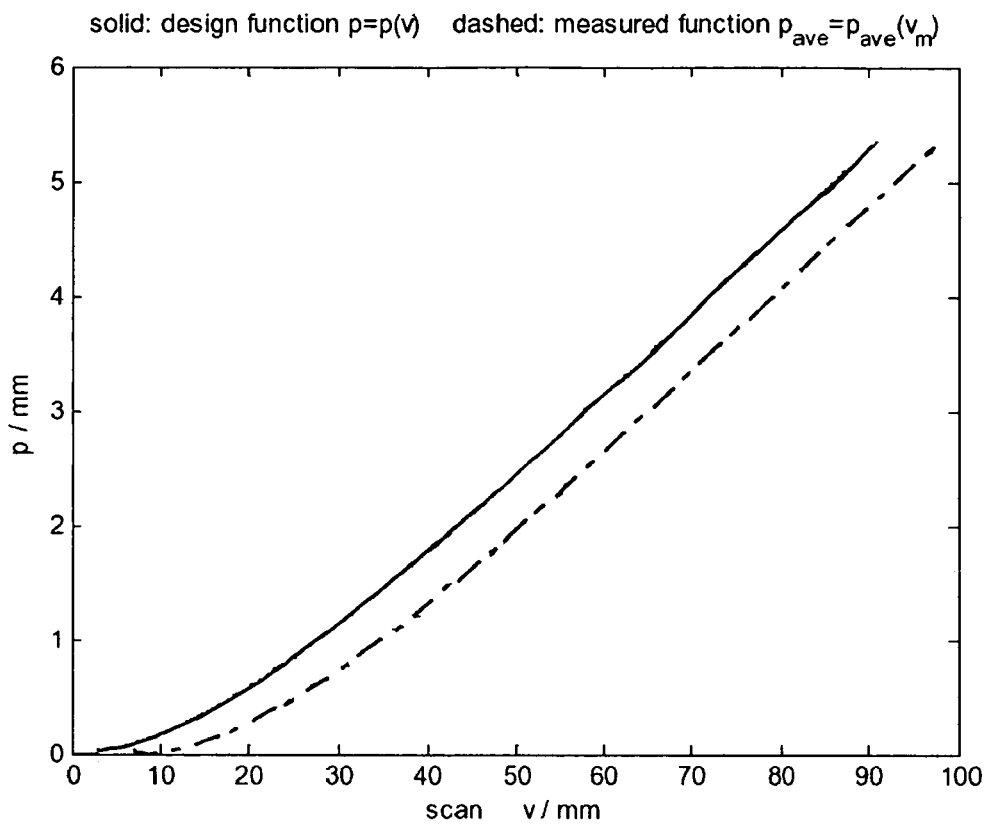
FIG. 28; shows the variation of the design function, $p=p(\nu)$ and $p_{ave}=p_{ave}(\nu_m)$ as a function of scan position $\nu$ and and is useful in applying a correction to the origin of the scanning measurements.
Figure 29:
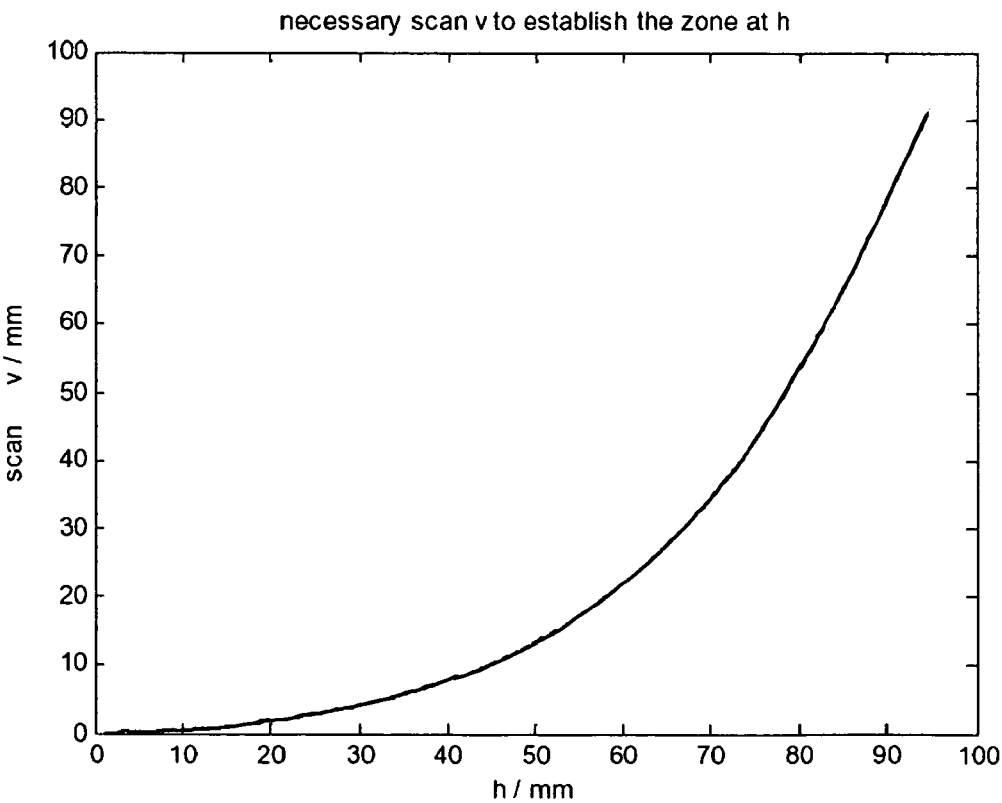
FIG. 29 is a graph showing the relationship between scan position $\nu$ and the parameter h and is useful in calculating the values of $\nu$ for equal increments of $\Delta h$ to determine non-equidistant scan steps for measuring the test surface.

FIG. 26 broadly shows the steps associated with measuring the deviation of the part form its design values. The part is first loaded and then manually brought close to $v=0$. Afterwards, it is aligned in x, y, and z with tips and tilts removed as needed using conventional methods and corrected for any other misalignments that could have a significant impact on the desired precision. Following this, the gap is measured, i.e., the apical difference between the reference surface and the aspheric surface of the measured part, which is by definition $d_0=g$ for $v=0$ as shown in FIG. 27. This may be done by moving the part to the focus point 8 (See FIG. 24) of the known converging spherical wavefront, measuring its location along the axis, and taking the difference between that location and the known radius of curvature of the reference surface 204, which is also known or measured previously.

After establishing the gap value, the measurement sequence is begun as shown in FIG. 27 to be described in further detail later. The measurement sequence generates data that is processed by computer 22 and used to evaluate the part by comparing its actual measurement with its design value normal to the surface, a result most useful for optical manufacturing. This result is reported and the deviation as previously defined and may be output in any number of ways including, but not limited to, graphical representations, topographical maps, data slices, fringe patterns, and the like. The part may then be precisely rotated and remeasured at a new rotational position and this can be repeated any desired number of time. Results are then averaged or otherwise statistically processed to minimize variations with rotational orientation about the axis.

Reference is now made to FIG. 27, which is a flow chart illustrating various steps in practicing the method for measuring from two phase measurements, $d_0(0,0)$ and $d_h(h,\theta)$ the deviation, $\Delta n$, of the aspheric surface normal to the surface as a function of polar coordinates, h and $\theta$.

The steps followed in the flow chart of FIG. 27 are as follows. In a first step, the part is mechanically set for a position were $v=0$, and the gap is established as previously mentioned in connection with the flow chart of FIG. 26. Before measuring the gap, however, a correction is first made. The position $v=0$ is defined by the shape of a curve $p_{ave}=p_{ave}(v)$, where $p_{ave}$ means the "average" value of $p(\theta, v)$ by integrating over v from 0 to $2\pi$. This measured average value $p_{ave}$ as a function of v can be compared with the design value, which may be mathematically expressed in standard form as a polynomial or its equivalent. An example of the design value $p=p(v)$ and the measured value $p_{ave}=p_{ave}(v_m)$ of such curves are given in the FIG. 28 where the design value is shown as the solid line and $p_{ave}$ as the dashed line. It can be seen that the dashed curve is horizontally shifted by a constant amount with respect to the design curve. In other words, the measured curve would coincide with the design curve, if the measured values $v_m$ would start at the correct origin of the coordinate system. By calculating the offset in the abscissa between the curves, a correction for the origin of the measurement of $v_m$ is derived. Now the gap between the reference surface and the part under test is measured. The "measured" value for $R_0$, i.e., $R_{0m}$ is then defined through the equation:

$$R_{0m}=R_2-g \tag{6}$$

where $R_2$ is the radius of curvature of the Fizeau reference surface and g is the gap. $R_0$ is the apex-radius of the aspherical surface, as it is used in the formula defining the asphere and also in the equations appearing in boxes 7 and 8 in the flowchart of FIG. 27. In the equation of box 8 in the flow diagram, calculating $h_m$, the measured value for $R_0$ must be used. In the case that the measured curve $p_{ave}(v_m)$ is not simply shifted with respect to the design curve, but is slightly different in shape too, the curves must be brought into coincidence by a fitting procedure to derive the lateral offset. This fitting procedure can be mathematically made such that the largest weight for the fit is given the values with small absolute values of p. This is justified by the fact that the coordinate centers of the curves should coincide; the curves may later deviate from each other due to a non-perfect aspherical surface. Because dp/dv is zero at p=0, it is not possible to only use the curve very close to p→0. A smooth weighting function starting with the highest weight for p=0 and then decreasing the weights until 0 for larger p values is adequate, and works properly.

Secondly, the part is scanned by an amount $\Delta v=fct(\Delta h)$ where the steps for $\Delta v$ are preferably chosen using the following procedure. The amount of steps to be performed in v, i.e., the steps $\Delta v$ can be pre-calculated from a curve $v=v(h)$, where v is the scan distance and h is the radius of the zone. Such a curve is given in FIG. 29. It is interesting that there is no problem in computing the curve of FIG. 29 pointwise, but it is not possible to generate this curve with sufficient precision globally, for instance, by a polynomial fit to the points. A local interpolation is no problem, and the needed accuracy can easily be achieved. The same is true for the curve: $p=p(v)$ of FIG. 28.

Next, measurements at the apex of the part→$d_0$ and the zone of the part→d are made to generate data for subsequent use. The definitions of d and $d_0$ can be seen in FIG. 25.

To take measurement data at the apex includes several steps. The scan-position of the part, i.e., the v-values are measured coarsely with an external measurement device, i.e., with a laser distance interferometer. On the other hand, a phase-measurement is made at the apex and the phase steps of $2\pi$ are removed. For this procedure the "center" of the field of view must be defined, because here the phase-unwrapping must start and also the value of the phase must be finally taken. The center of the field of view, shortly called "the center", can be defined by the center of a best fitting circle through the "zone". This is explained in detail hereafter. After the phase-unwrapping, Zernike functions are fitted to the measured phase values to reduce measurement noise. For these Zernike functions, the rotationally symmetrical functions, as well as all coma terms are used. Finally, the value at the center of the Zernike phase map is used as the measurement value. This gives the fringe fraction of the measurement by multiplying the phase-fraction by $\lambda/4\pi$. In addition, the fringe order number must be added, and this is derived from the distance measuring interferometer (DMI) readings and "tracking" of order numbers.

It may be possible for the phase-values measured directly at the apex of the part to be corrupted heavily by ghosts form the optics of the mainframe. In such a case, the accuracy might be not sufficient. If so, use may be made of the double phase shift method described in previously referenced U.S. Pat. No. 6,717,680 to solve this problem. Here, the reference surface is shifted in addition to the test surface, and the phases in the resultant 3 cavities: (1) test surface with reference surface; (2) test surface with ghost; and (3) reference surface with ghost are derived separately by solving a linear system of equations. Only the phase of cavity (1) has to be calculated explicitly.

The fourth step of taking measurement data at the zone is also done in several steps, which also include a fitting procedure, as with the apex. Here, a zone is predicted where measurement values can be expected. This zone prediction is performed with the help of the design values. Second, the measured phase fractions for the zone of interest are unwrapped to get a continuous phase-surface at the zone, which is similar to a torus. Third, a polynomial of the following form is fitted:

$$P(\theta,h)=P_0(h)+P_1(h)\cdot\cos\theta+P_2(h)\cdot\sin\theta \quad (7)$$

where $P_0$, $P_1$, and $P_2$ are polynomials of h. It is numerically important to shift and scale the coordinate system to center the abscissa values on the new coordinate system. The outer radius of the predicted zone becomes the new abscissa value of +1, the inner radius the value of −1. The order of the polynomials $P_0$, $P_1$, and $P_2$ is chosen such that the residual, when fitting the design asphere, is negligibly small (pm). Next, $P_0(h)$ is differentiated with respect to h to get the extreme value of the fitted phase. This value, together with the radii of the outer and the inner radius used for normalization of the polynomials, now delivers an "average" radius of a circle where the extreme value at the zone is located. At individual angular positions, $\theta$, the radius of the extreme value may be different, but globally the fitting procedure with the polynomial of Eq. (7) guaranties that the correct radius is found. This circle where—at an average—the extreme values are located, is conveniently called the "blue circle".

The two additional terms $P_1(h)\cdot\cos\theta$ and $P_2(h)\cdot\sin\theta$ express the effect of an additional tilt term that occurs when the local center of curvature of the asphere at the location of the zone does not coincide with the center of curvature of the Fizeau reference surface. This may have one, two, or three of 3 reasons: 1.) the aspherical surface has "intrinsic coma" at this zone; 2.) the aspherical surface has been tilted between the actual scan position and the position before it has already before been misaligned; and 3.) the aspherical surface has been laterally shifted between the actual scan position and the position before it has already previously been misaligned. Due to this additional tilt, the "blue circle" is shifted slightly laterally to the location where the extreme values would be located without the tilt component. This location is a circle with the same radius as the "blue circle" but with another center point. This is conveniently labeled the "red circle". The phase-values must be taken at the location of the "red circle".

The method for finding this lateral shift by using $P_1(h)$ and $P_2(h)$ for finding the center point of the "red circle" is as follows. The phase-values are measured with a detector with discrete locations for pixels. The phase-values at the "red circle", i.e., at a predefined number of angular positions on the red circle, must be found by an interpolation routine such as the procedure below:

1. Choose a "rough center" for the calculations, i.e., some initial position on the phase-map in detector coordinates, where the real "center", which is the center of the red circle, is roughly assumed.

2. Trace some radial lines in equal angle, increments with azimuth angle $\theta$ through this center (maybe 36), and calculate the phase-values along these lines around the "zone".

3. Find the extreme values $\phi(x,y)=\phi(\theta)$ of the phase.

4. Calculate a best fitting circle though the coordinate points x,y of the extreme values: center point (x—blue, y—blue) and radius (r—blue).

5. Fit functions $a\sin\theta$ and $b\cos\theta$ through the values $\phi(\theta)$; find the extreme values $p_1-p=p-p_2$ from $p_1-p=\sqrt{a^2+b^2}$ and the direction $\beta$ of the shift from the $\beta=\arctan(a/b)$.

6. The center for the red circle is found by x—red=x—blue+$\Delta x$ and y—red=y—blue+$\Delta y$ where $\Delta x$ and $\Delta y$ are computed from Eq. (8) as follows:

$$h_1 - h \approx \frac{R_e(z_e - (R_0 + v))}{2h_e T\sqrt{1+z'^2}}(p_1 - p_2) = \frac{R_e(z_e - (R_0 + v))}{2h_e\sqrt{1+z'^2}\sqrt{(z_e - (R_0+v))^2 + h_e^2}}(p_1 - p_2) \quad (8)$$

using the design values of the asphere, $p_1-p$ and $\beta$. It is r—red=r—blue.

7. Compute the phase values on the "red circle" by interpolation as done before (combination of Lagrange-Polynomials and cos and sin—function with a well defined coordinate center.

Referring back now to the flow chart of FIG. 27, the fifth step involves calculating the value of v: $v_m=d_{0m}-g$; (See FIG. 25). Also: $v_m$ is the result of tracking the fringe orders and adding the actual fringe fraction for the measurements $d_0$ at the apex, as described under 3.

The sixth step involves calculating the value of $p(\theta,v)$: $p_m(\theta,v_m)=d_m(\theta,v_m)-d_{0m}(v_m)$, see FIG. 25 again, where v is the azimuthal coordinate taken on the detector coordinate system. A rotationally symmetrical system (the mainframe) has no angular distortion. Therefore, no error is introduced, by taking the image coordinate v as the object coordinate v. The indices m are used to explicitly describe that these are measured, quantities. This differentiation of the design values is important later, when a measurement error is computed defined as the deviation of a measured quantity from the design value of that quantity.

Referring to step 7, a most important feature of the method is that the work is done in two "coordinate systems" as in two regimes; they are the p,v system and the z,h system. The equations give the connection between them.

Now, a measured surface error is expressed in the normal direction as a function of h. The quantity p is measured in the normal direction to the surface automatically by the "self adaptive" feature of the method. Therefore, an error in the normal direction is an error in p, i.e., it is by definition the deviation of the measured value from the "design value". But, now the "design value" for p at this location is required. So, it is very important to understand, that this location is not defined by h, but by $v_m$, i.e., the measured; value for v. Introducing $v_m$ into the design equations for the aspherical surface must deliver the design value for p. But the design equation for the aspherical surface is expressed in the coordinate system of h and z. Therefore, the first equation given in the step 7 box is first solved for h, and then this h value is inserted into the second equation of the box of step 7 to finally get the design value for p for the measured $v_m$.

As the eight step, the error in the normal direction is computed: $\Delta n = p_m - p_d$. This is a value that has a small gradient. This is because the error is small so the change of the error with the coordinates ($\theta$,h) is also small. Therefore, it is sufficient to use the equation for h in the step of box 9 for calculating the h coordinate in this case (in contrast to the step of box 7).

Another equation is used in the box of step 9. In this equation, not only the quantity $p=p(v)$ is needed, but also the first derivative of that function; $dp/dv = dp(v)/dv$. The differentiation can be done locally on the measured function, and it is very fortunate to use the averaged value of the function, $p=p(v)$, over all azimuthal positions for that. Thus, a very robust and numerically stable result is gained. We refer here to Eq. (7) where, by the fitting procedure a mean value for p is automatically gained and can be combined with v. It is also important to use the measured value for $R_0$ here (therefore it may better be written as $R_{0m}$).

Step 10 involves combining steps 8 and 9.

In accordance with step 11, it is very useful to rotate the part by 180 degrees (reversal) and perform a second scan to eliminate repeatable errors introduced by tip, tilt, and straightness errors in slide 11. However, under the assumption that the mechanical device performing the guidance of the part during the scan works completely reproducibly, we could differentiate between the intrinsic coma of the part and the extrinsically induced tilts and shift (which also cause coma in the result). This is done by rotating the phase-map of the second measurement by 180 degrees and then averaging with the first one. In this case, the externally induced coma errors cancel. Even when the reproducibility of the errors is not perfect, the part which was reproducible still will cancel. The fraction which was not reproducible is by definition now random. Therefore, this part also will be reduced, but only by the square root of the number of members in the average (due to the laws of statistics).

Step 12 ends the measurement sequence.

While the method of the invention works well for 90% of the part, near the inner 10% of the part special care needs to be taken. This is because v, p, and p' are all very small, so the prior equation for h can result in some uncertainty. Therefore, for this region, it is preferred to calculate h as a function of the measured value $v_m$ using the design equation of the aspheric surface and an iterative method using Newton's method for calculating zeros.

As stated earlier, the fundamental problem to be solved is to measure the deviation of the aspheric surface 9 from its nominal design shape in the normal direction as a function h (see FIG. 25). That is, $\Delta n = \Delta n(h)$ is desired. As p is measured in the normal direction, the measurement result is thus:

$$\Delta p(h_m) = p_m - p_d(h(v_m)) \quad (9),$$

where m stands for measured and d for design as a function of $h_m$. However, because of the uncertainty owing to very small numbers near the apex of the part, another approach for this region is used for convenience, and this approach will now be described.

The h-value of the part (lateral location of the extreme value at the zone) is related to an $h_2$-value of the same ray on the reference surface, (See FIG. 25). This $h_2$-value is further imaged by the mainframe onto the CCD detector and is then visible at the detector 171. The radius of the zone in pixel coordinates therefore can be established, so this is called the $h_{pix}$ value. Therefore, 3 h-values exist for every v-value and these are (h, $h_2$, $h_{pix}$).

For establishing the relation between the h and the $h_2$-values, the relationships of FIG. 25 are used. From FIG. 25, it is seen:

$$\frac{h_2}{h} = \frac{d+R}{R} = \frac{R_2}{R_0 + v - p} \quad (10)$$

where $R_2$ is the radius of the reference sphere of the TS. Because $R_2$ is known and with h, $h_2$ as a function of v, p and p' can be established:

$$h_2 = R_2 \sqrt{p'(2-p')} \quad (11)$$

It is very important that in Eq. 11 only $p' = p'(v)$ appears, which can also be substituted by $$\sin \alpha = \sqrt{p'(2-p)} \quad (12)$$

or expressed as a function of $z' = dz/dh$ by the conversion $$p' = 1 - \frac{1}{\sqrt{1+z'^2}} \quad (13)$$

Now, $h_2$ is not dependent on v directly, but simply on the aperture of the ray on the TS lens; this is in contrast to h, which depends not only on the aperture $\sin \alpha$, but also on v and p.

Having calculated the radius h of the (average) zone in both coordinate systems, i.e., having established a table with $h_2$ as well as $h_{pix}$ values for the different zones, polynomials are fit through functions $h_2 = f(h_{pix})$ and $h_{pix} = g(h_2)$. For this use is made of values of $h_2$ and $h_{pix}$ which satisfy the inequality of $h_2/h_{2max} > 0.1$ or $h_{pix}/h_{pixmax} > 0.1$, i.e., the very center of the part is not trying to be measured because of the problems of reliably finding the zone. But, it is known that there is another pair of values (h=0, $h_{pix}$=0), which must be fulfilled, so use is made of this fact in the ansatz-functions. These are, therefore polynomials of the forms, for instance:

$$h_2 = \beta \cdot h_{pix} \cdot (1 + a_2 h_{pix}^2 + a_4 h_{pix}^4 + \dots) \quad (14)$$

and $$h_{pix} = \gamma \cdot h_2 \cdot (1 + b_2 h_2^2 + b_4 h_2^4 + \dots) \quad (15)$$

where $$\beta \approx \gamma^{-1} \quad (16)$$

is the magnification factor of the paraxial imaging, which can alternatively be derived from the optics design. It has been assumed that it is precise enough for present purposes to use a function with three degrees of freedom, as shown in Eqs. (10) and (11); the criterion for the largest power of the polynomial used is that the residual after fit should not be larger than about 0.3 pixels.

After having done this, the imaging conditions of the interferometer set-up are known from experiment also in the vicinity of the vertex by using the polynomial of Eq. 14). Now using "conventional" Fizeau interferometry, a certain value of v (for instance also for v=0) can be related to the measured image height $h_{pix}$ with the height $h_2$ of the ray at the reference surface by the use of the polynomial from Eq. (14). These values are further transformed from $h_2$ to h by the equation:

$$h = \frac{h_2 \cdot (R_0 + v - p)}{R_2} \quad (18)$$

as derived from Eq. (10).

To derive the correct equation refer again to FIG. 25, now looking at the quantities d and $d_1$. The quantity d is the measured cavity thickness at the zone, and p is derived from d by $p=d-d_0$, where $d_0$ is the cavity thickness at the apex. Now looking into the vicinity of the zone d, i.e., d, as a function of h*. Use is made of this new symbol h* because it is valid for one fixed value of v. When the relation between h* and $h*_2$ is established, the problem of the uncertainty is solved because, for $h_2=h*_2$, the relation to the camera coordinates is independent of the value for v, i.e., Eq. (14) is true for every v.

From FIG. 25, the following relations are seen:

$$\overline{MP_1} = \sqrt{h^{*2} + (R_0 + v - z^*)^2} \quad (19)$$

$$\overline{MP_2} = R_2 \quad (20)$$

$$\rightarrow d_1 = R_2 - \sqrt{h^{*2} + (R_0 + v - z^*)^2} \quad (21)$$

This value $d_1$ as a function of h* is the design value for this configuration, i.e. for a given value of v. When h*→h, then $d_1$→d. Direct access to h* is not available because only $h*_2$ is available from the camera. Therefore, the coordinates of point $P_1$(h*,z*) of the design asphere are computed. Knowing these coordinates, the measured value for dim can be compared with the design value of did to get the error of the measured surface. Therefore, the design coordinates (h*,z*) are computed.

The design equation gives z*=fct(h*), but the problem is that only $h*_2$ is known and not h*. We thus establish the equation of a straight line through $P_2(h_2*,z_2*)$ and $M(0,R_0+v)$:

$$z(h) = (R_0 + v) - h \sqrt{\left(\frac{R_2}{h_2^*}\right)^2 - 1} \quad (22)$$

The other equation, that is solved simultaneously for (h,z) is the design equation for the aspherical surface:

$$z(h) = \left(\frac{c}{1 + \sqrt{1 - (1+k)c^2 h^2}} + a_2\right) h^2 + a_4 h^4 + \ldots + a_n h^n \quad (23)$$

Solving Eqs. (21) and (22) together leads to an iteration for h:

$$h_{i+1} := \frac{(R_0 + v) - \left(\frac{c}{1 + \sqrt{1-(1+k)c^2 h_i^2}} + a_2\right) h_i^2 - a_4 h_i^4 - \ldots - a_n h_i^n}{\sqrt{\left(\frac{R_2}{h_2^*}\right)^2 - 1}} \quad (24)$$

When the iteration comes to a stationary value h, this value is then h*. Inserting that value h* into either Eqs. (21) or (22) gives then z*. These values then can be inserted into Eq. (20) to get the design value for $d_1$.

Again, the error in the normal direction to the surface is needed. As the measurements are all relative, no absolute value for $d_1$ is achieved by the measurement, nor is it for d. But the value for d can be computed from the measurement of p, by the equation:

$$d = R_2 - (R_0 + v - p) \quad (25)$$

Therefore the phase difference $(d_1-d)$ can be measured interferometrically, by first removing the $2\pi$-phase-steps around the zone, and then subtracting the value found at the zone (this is the average value around the circle at the zone) from all measured phase-values around the zone the result in surface height is calculated, so the phase values must be multiplied by $\lambda/4\pi$.

This result is now compared with the equivalent design value around the zone, which results in the following difference:

$$d_1 - d = R_2 - \sqrt{h^{*2}+(R_0+v-z^*)^2} R_2 + (R_0+v-p_d) = (R_0+v-P_d) - \sqrt{h^{*2}+(R_0+v-z^*)^2} \quad (26)$$

where $p_d$ means design. This is essentially what is shown in FIG. 25 as the negative value of $\Delta$. Finally the error found in p for the zone must be added to the values again. The quantity v in Eq. (25) is the measured value for the scan distance v.

For the starting value for h for the iteration of Eq. (23), use is made of the coordinate $h_{start}$ from point P, which lies on the circle with radius R and center point M. From FIG. 25, we see the relations:

$$\frac{h_2}{h} = \frac{R_2}{R} \quad \frac{h_2^*}{h_{start}} = \frac{R_2}{R} \rightarrow h_{start} = \frac{h}{h_2} \cdot h_2^* \quad (27)$$

and with Eq. (10):

$$h_{start} = \frac{h_2^* \cdot (R_0 + v - p)}{R_2} \quad (28)$$

Having described the embodiments and operation of the invention, variations will occur to others based on its teachings. Therefore, it is intended that all such variations be within the scope of the invention.

What is claimed is:

1. An interferometric scanning method for measuring rotationally and non-rotationally symmetric test optics having aspherical surfaces, said method comprising the steps of:

generating at least a partial spherical wavefront along a scanning axis through the use of a decollimator carrying a spherical reference surface positioned along said scanning axis at a known location;

aligning a test optic with respect to said scanning axis and selectively moving said test optic along said scanning axis relative to said spherical reference surface so that said spherical wavefront intersects the test optic at the apex of the aspherical surface and at one or more annular zones where the spherical wavefront and the aspheric surface intersect where their tangents are common;

imaging the test surface onto a space resolving detector to form interferograms containing phase information about the differences in optical path length between the spherical reference surface and the test surface;

interferometrically measuring the axial distance, v, by which said test optic moves relative to said spherical reference surface; and analyzing said interferograms to determine the deviation in shape of said aspheric surface compared with its design in a direction normal to the aspheric surface based on the axial distance, v, and the phase information contained in said interferograms and providing output data of said deviation.

2. The interferometric scanning method of claim 1 wherein, prior to movement of the test optic with respect to the spherical reference surface, the axial distance, v, is set equal to zero and the initial gap, g, the axial distance between the reference surface and the test optic, is measured.

3. The interferometric scanning method of claim 1 where the common tangency where said spherical wavefront intersects the test optic occurs in a circular region near the apex of said aspherical surface and otherwise in said one or more annular zones spaced radially with respect to the axis.

4. The interferometric scanning method of claim 2 wherein said axial circular region and said annular zones are simultaneously imaged onto separate detectors using imaging optics of different magnification with the higher magnification imaging optics being used to image said axial circular region.

5. The interferometric scanning method of claim 4 wherein the average optical path length difference between the reference surface and the test optic around the annular zones is used in subsequent calculations to minimize to first order the effects of tilt and tip.

6. The interferometric scanning method of claim 5 wherein the location of the apex of said aspheric surface within said circular region is determined by interpolation.

7. An interferometric scanning method for measuring rotationally and non-rotationally symmetric test optics having aspherical surfaces, said method comprising the steps of:

generating at least a partial spherical wavefront from a known origin along a scanning axis through the use of a decollimator carrying a spherical reference surface positioned along said scanning axis at a known location with respect to said known origin;

aligning a test optic with respect to said scanning axis and selectively moving said test optic along said scanning axis relative to said spherical reference surface so that said spherical wavefront intersects the test optic at the apex of the aspherical surface and at one or more radial positions where the spherical wavefront and the aspheric surface intersect at points of common tangency;

imaging the test surface onto a space resolving detector to form interferograms containing phase information about the differences in optical path length between the spherical reference surface and the test surface at the one or more positions where points of common tangency occur and generating electrical signals carrying said phase information;

interferometrically measuring the axial distance, v, by which said test optic moves with respect to said origin; and determining the deviation in shape of said aspheric surface compared with its design in a direction normal to the aspheric surface based on the axial distance, v, and the phase information contained in said electrical signals and providing output data of said deviation.

8. The interferometric scanning method of claim 7 wherein said step of determining said deviation in the shape of said aspheric surface comprises the steps of:

calculating the optical path length differences, p, between the center of the test optic and the one or more radial positions based on said phase differences contained in said electronic signal; and calculating the coordinates, z and h, of the aspherical surface wherever said circles of curvature have intersected the aspherical surface at common points of tangency and in correspondence with the interferometrically measured distance, v and calculated optical path lengths, p.

9. The interferometric scanning method of claim 7 wherein, prior to movement of the test optic with respect to the spherical reference surface, the axial distance, v, is set equal to zero and the initial gap (g), the axial distance between the reference surface and the test optic, is measured.

10. The interferometric scanning method of claim 9 wherein the coordinates of the test optic are given by abscissa, z, and ordinate, h, and wherein the test optic and said reference surface are moved relative to one another by incremental amounts, $\Delta v = \mathrm{fct}(\Delta h)$.

11. The interferometric scanning method of claim 10 wherein measurement data is generated at the apex of the test optic to obtain, $d_0$, the axial separation between the test and reference surfaces, and d, the normal separation of the test and reference surfaces where points of common tangency occur.

12. The interferometric scanning method of claim 11 further including calculating the measured axial distance as, $v_m = g - d_0$, and the measured optical path length difference at the zone of the test optic as $p_m = d - d_0$.

13. The interferometric scanning method of claim 12 wherein the design optical path length difference, $p_d$ is computed independently of h as $p_d = p_d(vm)$.

14. The interferometric scanning method of claim 13 wherein the measured ordinate, $h_m$, is computed as $h_m = (R_0 + v_m - p_m) \cdot \sqrt{p_m} \cdot (2 - P_m)$.

15. The interferometric scanning method of claim 14 wherein the deviation in the normal direction between the design and measured values of the test surface are given as $\Delta n = p_m - p_d$ where $\Delta n = \mathrm{fct}(\Delta h_m)$.

16. The interferometric scanning method of claim 7 wherein said points of common tangency where said spherical wavefront intersects the test optic occur in a circular region near the apex of said aspherical surface and in one or more annular zones spaced radially with respect to the axis.

17. The interferometric scanning method of claim 16 wherein said axial circular region and said annular zones are simultaneously imaged onto separate detectors using imaging optics of different magnification with the higher magnification imaging optics being used to image said axial circular region.

18. The interferometric scanning method of claim 16 wherein the average optical path length difference between the reference surface and the test optic around the annular zones is used in subsequent calculations to minimize to first order the effects of tilt and tip.

19. The interferometric scanning method of claim 7 where, prior to measuring the gap, g, an offset in the abscissa between the design and measured curves for the shape of the aspheric test surface is calculated to provide a correction for the origin of the measurement of the axial distance, $v_m$.

20. The interferometric scanning method of claim 13 wherein the design optical path length difference, $p_d$, is computed independently of h as $p_d=p_d(v_m)$ by eliminating h from the two following equations:

$$v_m(h) = z(h) - R_0 + \frac{h}{z'(h)} \text{ and}$$

$$p_d(h) = z(h) + \frac{1 - \sqrt{1 + z'(h)^2}}{z'(h)} \cdot h$$

by first solving the first equation locally for h and then inserting the result into the second equation.

21. A scanning method for measuring rotationally and non-rotationally symmetric test optics having aspherical surfaces, said method comprising the steps of:
generating at least a partial spherical wavefront from a known origin along a scanning axis through the use of a decollimator carrying a spherical reference surface positioned along said scanning axis upstream of said known origin;
aligning a test optic with respect to said scanning axis and selectively moving said test optic along said scanning axis relative to said known origin so that said spherical wavefront intersects: the test optic at the apex of the aspherical surface and at one or more radial positions where the spherical wavefront and the aspheric surface intersect at points of common tangency;
imaging the test surface onto a space resolving detector to form interferograms containing phase information about the differences in optical path length between the spherical reference, surface and the test surface at the one or more positions where points of common tangency occur and generating electrical signals carrying said phase information;
interferometrically measuring the axial distance, v, by which said test optic moves with respect to said origin and calculating the optical path length differences, p, between the center of the test optic and the one or more radial positions based on said phase differences contained in said electronic signal,
calculating the coordinates, z and h, of the aspherical surface wherever said circles of curvature have intersected the aspherical surface at common points of tangency and in correspondence with the interferometrically measured distance, v and calculated optical path lengths, p; and
determining the deviation in shape of said aspheric surface compared with its design in a direction normal to the aspheric surface and providing output data of said deviation.

22. Interferometric scanning apparatus for measuring rotationally and non-rotationally symmetric test optics having aspherical surfaces, said apparatus comprising:
a source for generating a collimated beam of radiation along a scanning axis;
a decollimator carrying a spherical reference surface positioned at a known location along said scanning apparatus to receive said collimated beam and generate at least a partial spherical wavefront;
a precision positioning arrangement for holding and aligning a test optic with respect to said scanning axis and selectively moving said test optic along said scanning axis relative to said spherical reference surface so that said spherical wavefront intersects the test optic at the apex of the aspherical surface and at one or more annular zones where the spherical wavefront and the aspheric surface intersect where their tangents are common;
at least one space resolving detector;
an optical arrangement for imaging the test surface onto said space resolving detector to form interferograms containing phase information about the differences in optical path length between the spherical reference surface and the test surface;
an interferometer for measuring the axial distance; v, by which said test optic moves relative to said spherical reference surface; and
a control and analysis arrangement for analyzing said interferograms to determine the deviation in shape of said aspheric surface compared with its design in a direction normal to the aspheric surface based on the axial distance, v, and the phase information contained in said interferograms.

23. The interferometric scanning apparatus of claim 22 wherein said precision positioning arrangement and said control and analysis arrangement are configured and arranged so that, prior to movement of the test optic with respect to the spherical reference surface, the axial distance, v, is set equal to zero and the initial gap, g, the axial distance between the reference surface and the test optic, is measured.

24. The interferometric scanning apparatus of claim 22 where the common tangency where said spherical wavefront intersects the test optic occurs in a circular region near the apex of said aspherical surface and otherwise in said one or more annular zones spaced radially with respect to the axis.

25. The interferometric scanning apparatus of claim 24 further including another detector and wherein said optical arrangement is further configured to simultaneously image said axial circular region and said annular zones onto said detectors separately using imaging optics of different magnification with the higher magnification imaging optics being used to image said axial circular region.

26. The interferometric scanning apparatus of claim 25 wherein the average optical path length difference between the reference surface and the test optic around the annular zones is used in subsequent calculations to minimize the effects of tilt and tip to first order.

27. The interferometric scanning apparatus of claim 26 wherein the location of the apex of said aspheric surface within said circular region is determined by interpolation.

* * * * *